US012340670B2

(12) United States Patent
Almadi et al.

(10) Patent No.: US 12,340,670 B2
(45) Date of Patent: Jun. 24, 2025

(54) EMULATED FACILITY SAFETY WITH EMBEDDED ENHANCED INTERFACE MANAGEMENT

(71) Applicant: Saudi Arabian Oil Company, Dhahran (SA)

(72) Inventors: Soloman M. Almadi, Dhahran (SA); Fouad Alkhabbaz, Qatif (SA); Bander R. Al-Yousef, Al Mubarraz (SA); Abdullah Fayez Al-Halafi, Dammam (SA); Yousif Alghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 243 days.

(21) Appl. No.: 18/077,822

(22) Filed: Dec. 8, 2022

(65) Prior Publication Data

US 2023/0112611 A1    Apr. 13, 2023

Related U.S. Application Data

(63) Continuation-in-part of application No. 17/728,184, filed on Apr. 25, 2022, now Pat. No. 11,881,094,
(Continued)

(51) Int. Cl.
*G08B 21/00* (2006.01)
*G08B 21/02* (2006.01)

(52) U.S. Cl.
CPC ................... *G08B 21/02* (2013.01)

(58) Field of Classification Search
CPC .... G08B 21/02; G06Q 10/0635; G06Q 50/04; G06Q 90/205; G06Q 10/0631
(Continued)

(56) References Cited

U.S. PATENT DOCUMENTS

| 3,104,549 A | 9/1963 | Humbert et al. |
| 3,316,767 A | 5/1967 | Liebert |

(Continued)

FOREIGN PATENT DOCUMENTS

| CN | 102520388 | 6/2012 |
| CN | 203322437 | 12/2013 |

(Continued)

OTHER PUBLICATIONS

Almadi, "Intelligent Field Infrastructure Adoption: Approach and Best Practices," SPE 150066, Society of Petroleum Engineers (SPE), presented at the SPE intelligent Energy International Conference, Mar. 27-29, 2012, 12 pages.

(Continued)

*Primary Examiner* — Tai T Nguyen
(74) *Attorney, Agent, or Firm* — Fish & Richardson P.C.

(57) ABSTRACT

A computer-implemented method includes: connecting an infrastructure construction digital integrated twin ICDIT to an interface management system through one or more application program interfaces (APIs) of one or more databases storing information showing real-time activities of two or more execution agencies operating concurrently for an industrial plant facility, wherein the interface management system comprises rules governing interface points between the two or more execution agencies; scanning, using the APIs and according to the rules, the interface points of the two or more execution agencies, wherein the interface points are accessible through the interface management system; and migrating the interface points from the interface management system to a class library of the ICDIT such that when the ICDIT creates a rendering of the industrial plant facility, the interface points are mapped on the rendering according to up-to-date information based on the real-time activities of the two or more execution agencies.

20 Claims, 26 Drawing Sheets

Related U.S. Application Data which is a continuation of application No. 16/987,076, filed on Aug. 6, 2020, now Pat. No. 11,341,830.

(58) Field of Classification Search
USPC ............................................................. 340/540
See application file for complete search history.

(56) References Cited

U.S. PATENT DOCUMENTS

| | | | |
|---|---|---|---|
| 3,373,608 A | 3/1968 | Ketelsen | |
| 4,051,723 A | 10/1977 | Head et al. | |
| RE31,186 E | 3/1983 | Rosenweig | |
| 4,517,846 A | 5/1985 | Harrison et al. | |
| 4,757,314 A | 7/1988 | Aubin | |
| 4,777,833 A | 10/1988 | Carpenter | |
| 4,901,018 A | 2/1990 | Lew | |
| 4,965,996 A | 9/1990 | Morris | |
| 5,067,345 A | 11/1991 | Mougne | |
| 5,090,250 A | 2/1992 | Wada | |
| 5,164,897 A | 11/1992 | Clark | |
| 5,259,239 A | 11/1993 | Gaisford | |
| 5,392,648 A | 2/1995 | Robertson | |
| 5,417,118 A | 5/1995 | Lew et al. | |
| 5,586,310 A | 12/1996 | Sharman | |
| 5,975,204 A | 11/1999 | Tubel et al. | |
| 6,006,831 A | 12/1999 | Schlemmer et al. | |
| 6,046,685 A | 4/2000 | Tubel | |
| 6,085,599 A | 7/2000 | Feller | |
| 6,106,032 A | 8/2000 | Och | |
| 6,163,257 A | 12/2000 | Tracy | |
| 6,237,424 B1 | 5/2001 | Salmasi et al. | |
| 6,356,844 B2 | 3/2002 | Thomas et al. | |
| 6,463,807 B1 | 10/2002 | Feller | |
| 6,626,048 B1 | 8/2003 | Dam Es et al. | |
| 6,747,372 B2 | 6/2004 | Gilbreth et al. | |
| 6,882,904 B1 | 4/2005 | Petrie et al. | |
| 6,920,799 B1 | 7/2005 | Schulz | |
| 6,950,825 B2 | 9/2005 | Chang et al. | |
| 7,015,800 B2 | 3/2006 | Lesesky et al. | |
| 7,259,688 B2 | 8/2007 | Hirsch et al. | |
| 7,265,544 B2 | 9/2007 | Keese | |
| 7,469,188 B2 | 12/2008 | Wee | |
| 7,478,024 B2 | 1/2009 | Gurpinar et al. | |
| 7,493,140 B2 | 2/2009 | Michmerhuizen et al. | |
| 7,536,547 B2 | 5/2009 | Van Den Tillaart | |
| 7,540,202 B2 | 6/2009 | Bier | |
| 7,557,701 B2 | 7/2009 | Nunnazaki | |
| 7,574,907 B2 | 8/2009 | Maute | |
| 7,584,165 B2 | 9/2009 | Buchan | |
| 7,644,290 B2 | 1/2010 | Ransom et al. | |
| 7,653,936 B2 | 1/2010 | Oberst | |
| 7,739,359 B1 | 6/2010 | Millet et al. | |
| 7,828,065 B2 | 11/2010 | Ross | |
| 7,933,989 B1 | 4/2011 | Barker et al. | |
| 7,940,302 B2 | 5/2011 | Mehrotra et al. | |
| 8,039,991 B2 | 10/2011 | Wakitani et al. | |
| 8,051,722 B2 | 11/2011 | Voigt et al. | |
| 8,102,238 B2 | 1/2012 | Golander et al. | |
| 8,195,590 B1 | 6/2012 | Storek | |
| 8,271,212 B2 | 9/2012 | Sai et al. | |
| 8,280,635 B2 | 10/2012 | Ella et al. | |
| 8,312,320 B2 | 11/2012 | Almadi | |
| 8,323,392 B2 | 12/2012 | Jones et al. | |
| 8,334,775 B2 | 12/2012 | Tapp et al. | |
| 8,359,171 B2 | 1/2013 | Bleys et al. | |
| 8,365,250 B2 | 1/2013 | Denny | |
| 8,365,612 B2 | 2/2013 | Izumi | |
| 8,543,716 B1 | 9/2013 | Rashidi | |
| 8,667,091 B2 | 3/2014 | Almadi | |
| 8,732,106 B1 | 5/2014 | Presgraves et al. | |
| 8,750,513 B2 | 6/2014 | Renkis | |
| 8,761,911 B1 | 6/2014 | Chapman et al. | |
| 8,792,115 B2 | 7/2014 | Harano | |
| 8,875,379 B2 | 11/2014 | Maute | |
| 8,884,759 B2 | 11/2014 | Oktem et al. | |
| 8,887,241 B2 | 11/2014 | Britton et al. | |
| 8,972,742 B2 | 3/2015 | Troncoso Pastoriza et al. | |
| 9,147,174 B2 | 9/2015 | Glickman et al. | |
| 9,208,676 B2 | 12/2015 | Fadell et al. | |
| 9,210,179 B2 | 12/2015 | Mevec et al. | |
| 9,396,599 B1 | 7/2016 | Malhotra | |
| 9,467,472 B2 | 10/2016 | Weiner et al. | |
| 9,568,909 B2* | 2/2017 | Lawson | G06F 16/248 |
| 9,699,768 B2 | 7/2017 | Werb | |
| 9,760,075 B2 | 9/2017 | Fisher-Rosemont | |
| 10,031,500 B1* | 7/2018 | Diaz | G05B 19/042 |
| 10,330,511 B2 | 6/2019 | Alkhabbaz et al. | |
| 10,462,884 B2 | 10/2019 | Jayawardena et al. | |
| 10,514,415 B2 | 12/2019 | Jayawardena et al. | |
| 10,551,047 B2 | 2/2020 | Treible, Jr. et al. | |
| 11,341,830 B2 | 5/2022 | Al-Yousef et al. | |
| 2002/0152053 A1 | 10/2002 | Roy et al. | |
| 2003/0117298 A1 | 6/2003 | Seely | |
| 2004/0045368 A1 | 3/2004 | Schoeb | |
| 2004/0075566 A1* | 4/2004 | Stepanik | G01N 33/0075 |
| | | | 340/870.3 |
| 2004/0098592 A1 | 5/2004 | Taki | |
| 2004/0188710 A1 | 9/2004 | Koren et al. | |
| 2005/0015624 A1 | 1/2005 | Ginter et al. | |
| 2005/0184084 A1 | 8/2005 | Wells | |
| 2005/0193832 A1 | 9/2005 | Tombs et al. | |
| 2005/0228683 A1 | 10/2005 | Saylor et al. | |
| 2006/0032547 A1 | 2/2006 | Rossi | |
| 2006/0085174 A1 | 4/2006 | Hemanthkumar | |
| 2006/0086497 A1 | 4/2006 | Ohmer et al. | |
| 2006/0107061 A1 | 5/2006 | Holovacs | |
| 2007/0018009 A1 | 1/2007 | Choi et al. | |
| 2007/0126576 A1 | 6/2007 | Script et al. | |
| 2007/0163359 A1 | 7/2007 | Nielsen | |
| 2007/0193834 A1 | 8/2007 | Pai | |
| 2007/0198223 A1 | 8/2007 | Ella et al. | |
| 2008/0061984 A1 | 3/2008 | Breed et al. | |
| 2008/0109883 A1 | 5/2008 | Hernoud et al. | |
| 2008/0109889 A1 | 5/2008 | Bartels et al. | |
| 2008/0139195 A1 | 6/2008 | Marsyla et al. | |
| 2008/0228908 A1 | 9/2008 | Link | |
| 2008/0251260 A1 | 10/2008 | Ross et al. | |
| 2008/0274766 A1 | 11/2008 | Pratt et al. | |
| 2009/0012631 A1 | 1/2009 | Fuller | |
| 2009/0037607 A1 | 2/2009 | Farinacci et al. | |
| 2009/0089108 A1 | 4/2009 | Angell et al. | |
| 2009/0138353 A1 | 5/2009 | Mendelson | |
| 2009/0141896 A1 | 6/2009 | McCown | |
| 2009/0170468 A1 | 7/2009 | Kane | |
| 2009/0210081 A1 | 8/2009 | Sustaeta | |
| 2009/0224930 A1 | 9/2009 | Burza | |
| 2010/0097205 A1 | 4/2010 | Script | |
| 2010/0228584 A1 | 9/2010 | Nash | |
| 2010/0231410 A1 | 9/2010 | Seisenberger | |
| 2010/0292857 A1 | 11/2010 | Bose et al. | |
| 2011/0066454 A1 | 3/2011 | Rosauer et al. | |
| 2011/0071963 A1 | 3/2011 | Piovesan et al. | |
| 2011/0074551 A1 | 3/2011 | Higashionji | |
| 2011/0136463 A1 | 6/2011 | Ebdon | |
| 2011/0178977 A1 | 7/2011 | Drees | |
| 2011/0181426 A1 | 7/2011 | Bucciero et al. | |
| 2011/0288692 A1 | 11/2011 | Scott | |
| 2011/0296377 A1 | 12/2011 | Morozov et al. | |
| 2012/0022700 A1 | 1/2012 | Drees et al. | |
| 2012/0059634 A1 | 3/2012 | Bouzarkouna | |
| 2012/0060030 A1 | 3/2012 | Lamb | |
| 2012/0063354 A1 | 3/2012 | Vanga et al. | |
| 2012/0084400 A1 | 4/2012 | Almadi et al. | |
| 2012/0162423 A1 | 6/2012 | Xiao | |
| 2012/0172085 A1 | 7/2012 | Vuppu | |
| 2012/0307051 A1 | 12/2012 | Welter | |
| 2013/0085687 A1 | 4/2013 | Danov et al. | |
| 2013/0086650 A1 | 4/2013 | Soundrapandian et al. | |
| 2013/0088429 A1 | 4/2013 | Yang | |
| 2013/0103749 A1 | 4/2013 | Weth et al. | |
| 2013/0110411 A1 | 5/2013 | Black et al. | |
| 2013/0136597 A1 | 5/2013 | Hansen et al. | |
| 2013/0151020 A1 | 6/2013 | Manninen et al. | |
| 2013/0162405 A1 | 6/2013 | Forster | |

(56) References Cited

U.S. PATENT DOCUMENTS

| | | |
|---|---|---|
| 2013/0212259 A1 | 8/2013 | Rankov et al. |
| 2013/0247117 A1 | 9/2013 | Yamada |
| 2013/0282641 A1 | 10/2013 | Martin et al. |
| 2014/0019768 A1 | 1/2014 | Pineau et al. |
| 2014/0046863 A1 | 2/2014 | Gifford et al. |
| 2014/0089671 A1 | 3/2014 | Logue |
| 2014/0118239 A1 | 5/2014 | Phillips |
| 2014/0139681 A1 | 5/2014 | Jones, Jr. et al. |
| 2014/0150549 A1 | 6/2014 | Rieger et al. |
| 2014/0156584 A1 | 6/2014 | Motukuri et al. |
| 2014/0230057 A1 | 8/2014 | Berger |
| 2014/0240088 A1 | 8/2014 | Robinette |
| 2014/0254799 A1 | 9/2014 | Husted |
| 2014/0261791 A1 | 9/2014 | Grabau et al. |
| 2014/0280953 A1 | 9/2014 | Brzozowski et al. |
| 2014/0310059 A1 | 10/2014 | Ellis |
| 2014/0337086 A1 | 11/2014 | Asenjo et al. |
| 2014/0340222 A1 | 11/2014 | Thornton |
| 2014/0342373 A1 | 11/2014 | Viovy et al. |
| 2015/0074023 A1 | 3/2015 | Gu |
| 2015/0109104 A1 | 4/2015 | Fadell |
| 2015/0116111 A1 | 4/2015 | Foster |
| 2015/0137967 A1 | 5/2015 | Wedig |
| 2015/0152035 A1 | 6/2015 | Shin et al. |
| 2015/0195789 A1 | 7/2015 | Yoon |
| 2015/0220321 A1 | 8/2015 | Jung |
| 2016/0006745 A1 | 1/2016 | Furuichi |
| 2016/0047663 A1 | 2/2016 | Iyer |
| 2016/0049064 A1 | 2/2016 | McNabb |
| 2016/0100437 A1 | 4/2016 | Amstrong et al. |
| 2016/0123111 A1 | 5/2016 | Kim |
| 2016/0206136 A1 | 7/2016 | Storek |
| 2016/0234239 A1 | 8/2016 | Knapp et al. |
| 2016/0259637 A1 | 9/2016 | Kumar |
| 2016/0259647 A1 | 9/2016 | Kim et al. |
| 2016/0379211 A1 | 12/2016 | Hoyos |
| 2017/0031840 A1 | 2/2017 | Cawse et al. |
| 2017/0034193 A1 | 2/2017 | Schulman et al. |
| 2017/0053224 A1 | 2/2017 | Duca et al. |
| 2017/0061715 A1 | 3/2017 | Busch-Sorensen |
| 2017/0184659 A1 | 6/2017 | Jayawardena et al. |
| 2017/0230462 A1* | 8/2017 | Ascheid ............... H04L 67/56 |
| 2017/0284191 A1 | 10/2017 | Martin |
| 2017/0289812 A1 | 10/2017 | Werb |
| 2017/0353491 A1 | 12/2017 | Gukal |
| 2017/0356780 A1 | 12/2017 | Smith et al. |
| 2018/0092331 A1 | 4/2018 | Zuidhof |
| 2018/0156437 A1 | 6/2018 | Freer et al. |
| 2019/0149894 A1 | 5/2019 | Weatherhead et al. |
| 2019/0159322 A1 | 5/2019 | Jayawardena et al. |
| 2019/0234603 A1 | 8/2019 | Treible, Jr. et al. |
| 2019/0295207 A1 | 9/2019 | Day |
| 2019/0318170 A1 | 10/2019 | Rokade et al. |
| 2019/0340909 A1 | 11/2019 | Nguyen et al. |
| 2020/0259896 A1* | 8/2020 | Sachs ............... H04W 56/0065 |
| 2021/0014308 A1 | 1/2021 | Larsson |
| 2021/0084436 A1 | 3/2021 | Sutherland |
| 2021/0158664 A1 | 5/2021 | Correnti |
| 2022/0044538 A1 | 2/2022 | Al-Yousef et al. |
| 2022/0246012 A1 | 8/2022 | Al-Yousef |
| 2023/0100635 A1 | 3/2023 | Alkhabbaz et al. |

FOREIGN PATENT DOCUMENTS

| | | |
|---|---|---|
| CN | 205862806 | 1/2017 |
| EP | 0770856 | 9/2003 |
| EP | 1612741 | 1/2006 |
| EP | 1832548 | 12/2007 |
| EP | 2396273 | 12/2011 |
| EP | 3196716 | 7/2017 |
| GB | 1493527 | 11/1977 |
| GB | 2580470 | 7/2020 |
| JP | H 07152789 | 6/1995 |
| JP | 2014119266 | 6/2014 |
| WO | WO 2009000283 | 12/2008 |
| WO | WO 2015058134 | 4/2015 |
| WO | WO 2016073267 | 5/2016 |
| WO | WO 2016097998 | 6/2016 |
| WO | WO 2018207123 | 11/2018 |
| WO | WO 2019211764 | 11/2019 |

OTHER PUBLICATIONS

Boman, rigzone.com [online], "IoT Technology to Reduce Need for Oil, Gas Workers Offshore," Oct. 14, 2016, retrieved from URL <https://www.rigzone.com/news/oil_gas/a/147044/iot_technology_to_reduce_need_for_oil_gas_workers_offshore/>, 5 pages.

Canaz, "Planar and Linear Feature-Based Registration of Terrestrial Laser Scans with Minimum Overlap Using Photogrammetric Data," Masters Thesis, University of Calgary, Dec. 2012, 142 pages.

Cohen, "Reducing Business Surprises through Proactive, Real-Time Sensing and Alert Management," EESR Workshop on End-to-End, Sense-and Respond Systems, Applications and Services, 2005, 6 pages.

Gokce et al., "Vision-Based Detection and Distance Estimation of Micro Unmanned Aerial Vehicles," Sensors, 2015, 15:23805-23846, 42 pages.

Hale, "Evaluating safety management and culture interventions to improve safety: Effective intervention strategies," Safety Science, Oct. 2010, 48(8):1026-1035, 10 pages.

Huia et al., "Prediction of Safety Objective of an Enterprise using Fuzzy Neural Network," International Symposium on Safety Science and Engineering in China, Procedia Engineering, 43:162-167, 2012, 6 pages.

Husain et al., "Quantifying the Intelligent Field Added Values," SPE 167439, Society of Petroleum Engineers (SPE), presented at the SPE Middle East Intelligent Energy Conference and Exhibition, Oct. 28-30, 2013, 9 pages.

Memon et al., "Distributed control system for process control using intelligent agents," WSEAS Transactions on Systems, retrieved from URL <:https://www.researchgate.net/publication/270214069_Distributed_control_system_for_process_control_using_intelligent_agents>, retrieved on May 17, 2019, available on or before Mar. 1, 2006, 10 pages.

offshore-technology.com [online], "Take Control: Smart Valves Step Forward," retrieved from URL <http://www.offshore-technology.com/features/feature2034/>, Jun. 18, 2008, 6 pages.

Petrie et al., "Chapter 1: Introduction to Laser Ranging, Profiling, and Scanning," Topographic Laser Ranging and Scanning: Principles and Processing, 2008, 29 pages.

Petrie et al., "Chapter 3: Terrestrial Laser Scanners," Topographic Laser Ranging and Scanning: Principles and Processing, 2009, 43 pages.

pyimagesearch.com [online], Rosebrock, "Find distance from camera to object/marker using Python and OpenCV," Jan. 2015, retrieved on Oct. 21, 2020, retrieved from URL <https://www.pyimagesearch.com/2015/01/19/find-distance-camera-objectmarker-using-python-opencv/>, 109 pages.

Reneke et al., "Research Roadmap for Smart Fire Fighting NIST SP 1191," National Institute of Standards and Technology, Jun. 2015, 1-247, 247 pages.

Storey, controleng.com [online], "Building a Maintenance Management Program for Valves," Control Engineering, Apr. 17, 2014, retrieved from URL <http://www.controleng.com/industry-news/single-article/building-a-maintenance-management-program-for-valves/20afd59f11c5dec4ec222cc79937e40b.html>, 3 pages.

* cited by examiner

EMULATED FACILITY SAFETY WITH EMBEDDED ENHANCED INTERFACE MANAGEMENT

CROSS REFERENCE TO RELATED APPLICATIONS

This application is a Continuation-in-Part of U.S. patent application Ser. No. 17/728,184, filed on Apr. 25, 2022, now U.S. Pat. No. 11,881,094, which is a continuation of U.S. patent application Ser. No. 16/987,076, filed on Aug. 6, 2020, now U.S. Pat. No. 11,341,830. The disclosure of each of the foregoing applications is hereby incorporated by reference in its entirety.

TECHNICAL FIELD

This disclosure generally relates to infrastructure construction and management.

BACKGROUND

Infrastructure construction and management may be based on progressing data from independent systems with massive data entries.

SUMMARY

In one aspect, implementations may provide a computer-implemented method to manage an infrastructure construction digital integrated twin (ICDIT) for an industrial plant facility where two or more execution agencies operate concurrently, the method including: connecting the ICDIT to an interface management system through one or more application program interfaces (APIs) of one or more databases storing information showing real-time activities of the two or more execution agencies operating concurrently for the industrial plant facility, wherein the interface management system comprises rules governing interface points that bridge communication between the two or more execution agencies; scanning, using the APIs and according to the rules, the interface points of the two or more execution agencies, wherein the interface points are accessible through the interface management system; and at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agency.

Implementations may include one or more of the following features.

Each interface point may include at least one unique attribute for mapping to the class library of the ICDIT, and the at least one unique attribute may include a tag number.

The method may further include: creating one or more new attributes based on an interface point accessible through the interface management system.

The migrating may further include: adding the one or more new attributes to the class library.

The method may further include: subsequent to said migrating, comparing attributes of the interface points migrated from different execution agencies into the class library.

The method may further include: in response to determining that an attribute of a migrated interface point from a first execution agency does not match the attribute of the migrated interface point from a second execution agency, flagging the migrated interface point as a risk; and calculating a risk score based on a number of interdependencies by other interface points on the migrated interface point.

The attributes may include at least one of: a material specification, a size, a classification, a material classification, and a schedule, and the real-time activities may encompass construction activities as well as operation activities of the industrial plant facility.

In another aspect, implementations may provide computer system comprising: a network of sensors comprising microsound sensors; a processor; and at least one memory, wherein at least one memory comprise software instructions that, when executed by the processor, cause the processor perform operations to manage an infrastructure construction digital integrated twin (ICDIT) for an industrial plant facility where two or more execution agencies operate concurrently, the operations comprising: connecting the ICDIT to an interface management system through one or more application program interfaces (APIs) of one or more databases storing information captured by the network of sensors showing real-time activities of the two or more execution agencies operating concurrently for the industrial plant facility, wherein the interface management system comprises rules governing interface points that bridge communication between the two or more execution agencies; scanning, using the APIs and according to the rules, the interface points of the two or more execution agencies, wherein the interface points are accessible through the interface management system; and at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agency.

Implementations may include one or more of the following features.

Each interface point may include at least one unique attribute for mapping to the class library of the ICDIT, and the at least one unique attribute may include a tag number.

The operations may further include: creating one or more new attributes based on an interface point accessible through the interface management system.

The migrating may further include: adding the one or more new attributes to the class library.

The operations may further include: subsequent to said migrating, comparing attributes of the interface points migrated from different execution agencies into the class library.

The operations may further include: in response to determining that an attribute of a migrated interface point from a first execution agency does not match the attribute of the migrated interface point from a second execution agency, flagging the migrated interface point as a risk; and calculating a risk score based on a number of interdependencies by other interface points on the migrated interface point.

The attributes may include at least one of: a material specification, a size, a classification, a material classification, and a schedule, and the real-time activities may encompass construction activities as well as operation activities of the industrial plant facility.

In yet another aspect, some implementations provide non-volatile computer readable medium comprising software instructions, which, when executed by a computer processor, cause the computer processor perform operations to manage an infrastructure construction digital integrated twin (ICDIT) for an industrial plant facility where two or more execution agencies operate concurrently, the operations comprising: connecting the ICDIT to an interface management system through one or more application program interfaces (APIs) of one or more databases storing information showing real-time activities of the two or more execution agencies operating concurrently for the industrial plant facility, wherein the interface management system comprises rules governing interface points that bridge communication between the two or more execution agencies; scanning, using the APIs and according to the rules, the interface points of the two or more execution agencies, wherein the interface points are accessible through the interface management system; and at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agency.

Implementations may include one or more of the following features.

Each interface point may include at least one unique attribute for mapping to the class library of the ICDIT, and the at least one unique attribute may include a tag number.

The operations may further include: creating one or more new attributes based on an interface point accessible through the interface management system. The migrating may further include: adding the one or more new attributes to the class library.

The operations may further include: subsequent to said migrating, comparing attributes of the interface points migrated from different execution agencies into the class library.

The operations may further include: in response to determining that an attribute of a migrated interface point from a first execution agency does not match the attribute of the migrated interface point from a second execution agency, flagging the migrated interface point as a risk; and calculating a risk score based on a number of interdependencies by other interface points on the migrated interface point.

The attributes may include at least one of: a material specification, a size, a classification, a material classification, and a schedule, and the real-time activities may encompass construction activities as well as operation activities of the industrial plant facility.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to infrastructure construction and management. The current industry practice in infrastructure construction and buildout progressing and quality integrity is based on manual processing supported by independent systems with massive data entries. Moreover, the current practice lacks an integrated system that can capture the whole process of construction from design, supplies, construction asset, construction tools, material, workforce, and quality controls. In contrast, the present disclosure introduces an end-to-end operating model for an integrated digital twin, Infrastructure Construction Digital Integrated Twin (ICDigIT), the serves to bridge the construction and operation of an industrial facility. For example, the ICDIT encompasses the complete cycle of the facility construction and operation, including, Engineering Design and Simulation, Procurement and Logistics, Construction and Handover, and Operation and maintenance. The supply chain management attribute across these four main segments is included.

The Infrastructure Construction Digital Integrated Twin (ICDIT) is based on interaction and interplay between exemplary components in designing and construction of a plant facility. These components encompass various aspects of data sensing, collection, exchange, and computing. In one use case example, implementations of ICDIT can track asset build/assembly during construction. Here, real-time information such as imagery from the construction site, data from traffic scanning of asset movements, data from sensor networks at the construction site may be leveraged to determine construction progress, inventory tracking, resource efficiency, etc. In another use case example, a controller provides route mapping and localization services throughout the plant for which guided escape routes maybe improvised in hazardous events such as gas leaks, fire outbreaks or accidents during construction activities. In other words, during an emergency, a wearable device on a crew member may be equipped with real-time location and situation awareness information to navigate the crew member through the thick of the emergency to safety.

Figure 1A:
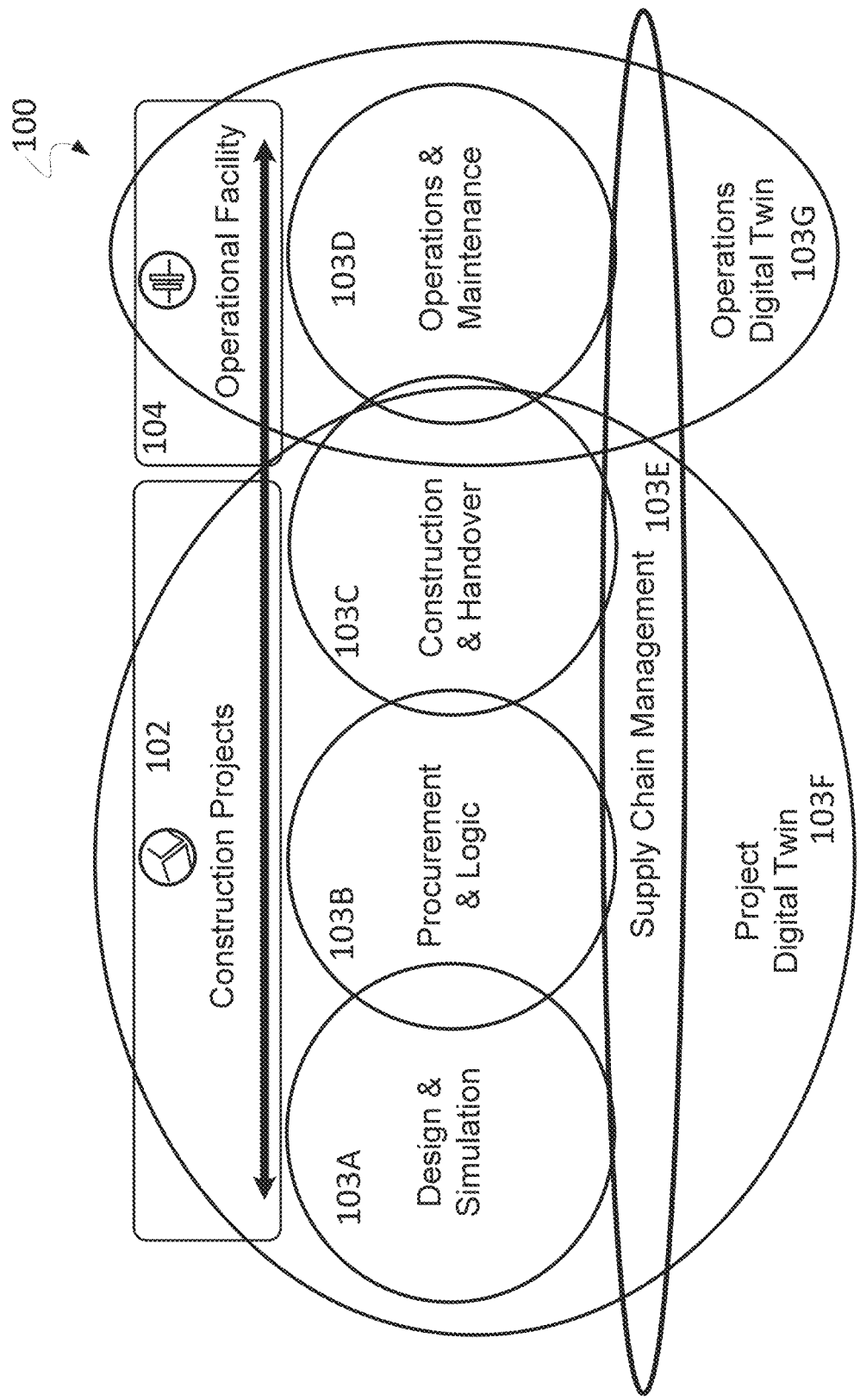
FIGS. 1A to 1C illustrate examples of various aspects of an Infrastructure Construction Digital Integrated Twin (IC-DigIT) according to an implementation of the present disclosure.
Figure 1B:
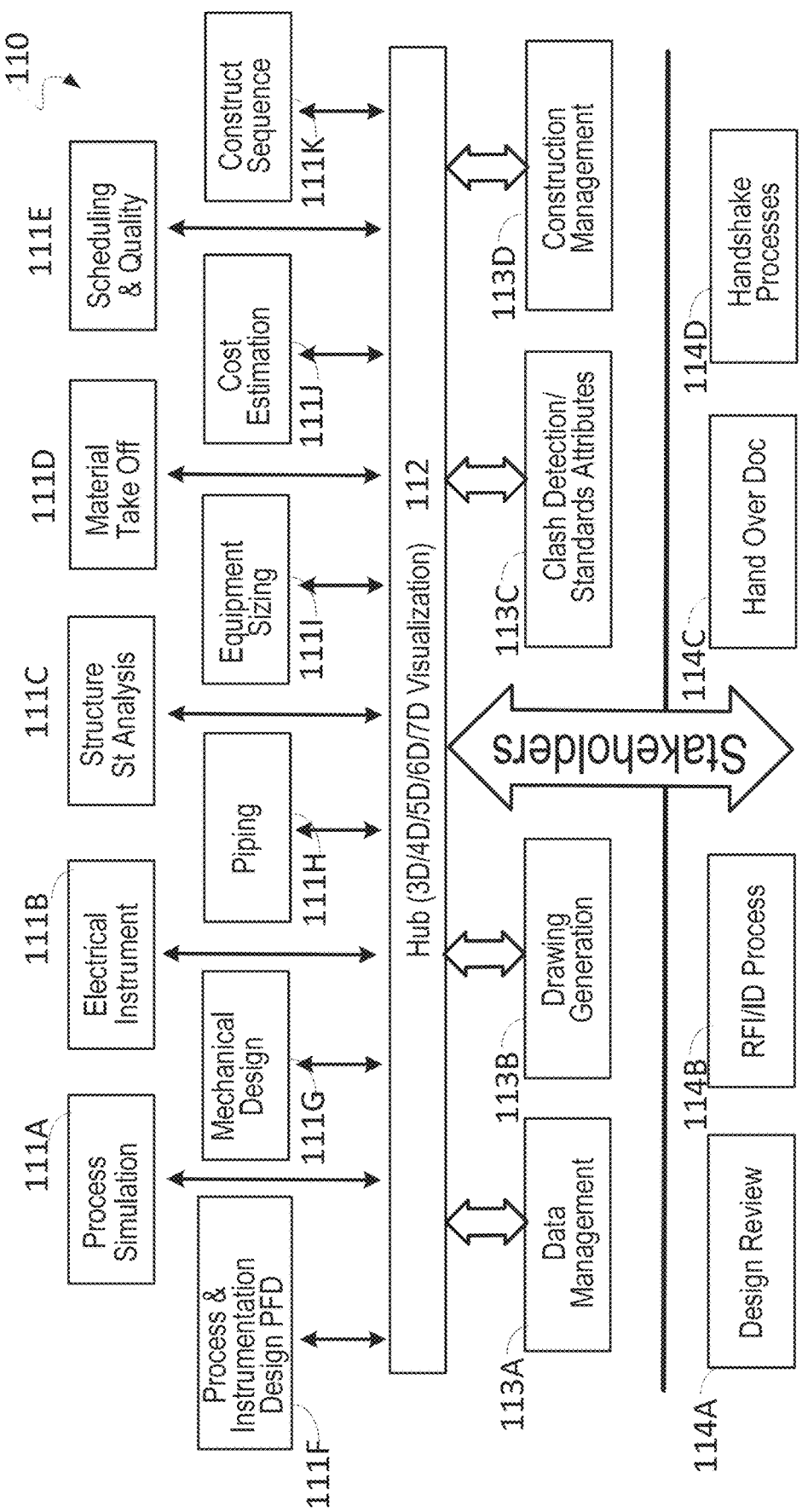
Figure 1C:
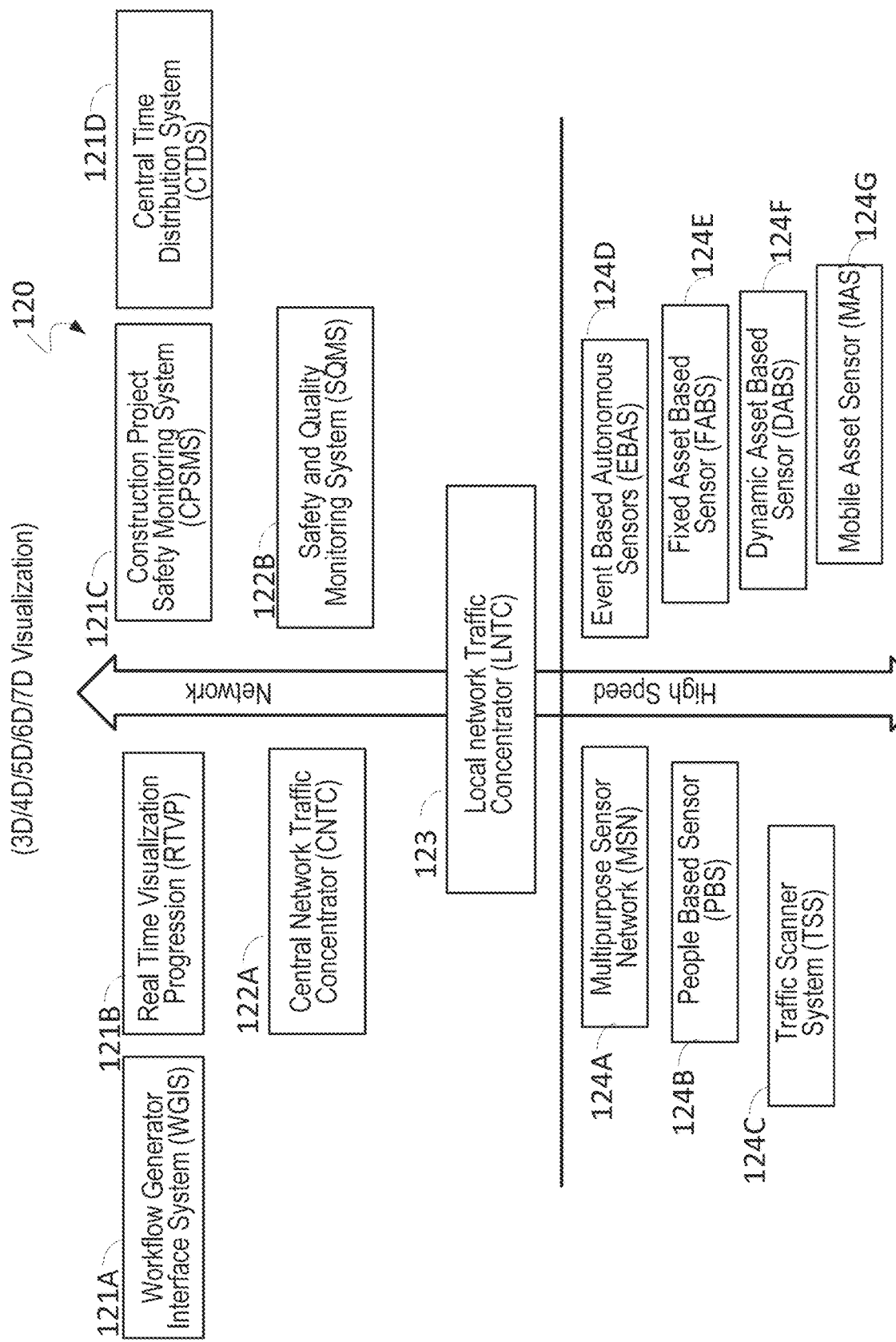

FIGS. 1A to 1C illustrate examples of various aspects of an Infrastructure Construction Digital Integrated Twin (ICDIT). As illustrated by diagram 100, the ICDIT encompasses complete cycles of the facility construction and operation, including construction projects 102 running the project digital twin 103F and operation facility 104 running the operations digital twin 103G. The project digital twin may include engineering design and simulation module 103A, procurement and logistics module 103B, and construction and handover module 103C. The operations digital twin 103G may include operations and maintenance module 103D. The supply chain management module 103E may extend over both twins.

The ICDIT 100 is based on interaction/interplay between the components in designing and construction of plant facility, which, as illustrated by diagram 110, can include superimposed multidimensional data acquisitions, processing, correlation, and visualization. The multidimensional aspects can include 3D, 4D (time), 5D (Cost), 6D (Efficiency), up to 7D (Operate & Maintain). These components, as outlined below, together form the digital twin for the facility construction. The visualization Hub 112 interacts with process simulation module 111A, electric instrument module 111B. structure stability analysis module 111C, material take-off 111D, scheduling and quality 111E, process and instrumentation design PFD 111F, mechanical design module 111G, piping module 111H, equipment sizing module 111I, cost estimation module 111J, construction sequence module 111K. As illustrated, the visualization hub 112 engages data management 113A, drawing generation 113B, clash detection/standards attributes 113C, and construction management 113D. The visualization hub 112 further engages design review 114A, RFT/ID process 114B, hand over document 114C, and handshake processes 114D.

The ICDIT 100 incorporates data sensing, collection, exchange, and computing over high-speed network exemplified by local network traffic concentrator LNTC 123, as illustrated by diagram 120 of FIG. 1C. In more detail, The ICDIT 100 is based on interaction, interplay of hierarchical building blocks including work flow generator interface system (WGIS) 121A, real time visualization progression RTVP 121B, construction project safety monitoring system (CPSMS) 121C, central time distributed system (CTDS) 121D, central network traffic concentrator (CNTC) 122A, safety and quality monitoring system (SQMS) 122B. Through high speed network managed by local network traffic concentrator (LNTC) 123, multipurpose sensor network (MSN) 124A, people based sensor (PBS) 124B, traffic scanner system (TSS) 124C, event based autonomous sensors (EBAS) 124D, fixed asset based sensor (FABS) 124E, dynamic asset based sensor (DABS) 124F, and mobile asset sensor (MAS) 124G jointly provide location and situation awareness for multidimensional visualization including 3D, 4D (time), 5D (Cost), 6D (Efficiency), up to 7D (Operate & Maintain).

The local network traffic concentrator (LNTC) 123 can connect to wired and wireless field devices and networks. The LNTC 123 includes computing and data storage capability. The LNTC can process all collected data and produce reporting and new database that can be used by other 3$^{rd}$ party applications for Artificial Intelligence (AI) and Machine learning application. The LNTC 123 includes software interface capabilities (Application Programming Interface or API) to connect with other databases locally or in wide area network. The LNTC 123 can translate captured images for the dynamic asset and establish mapping to the facility build out plan, timelines, asset inventory, and produce a predictive model on anticipated progress, asset consumption. In some cases, the LNTC 123 can capture all the data from the operator within the facility, can capture data from mobile, can translate captured images for the dynamic asset and detect metrological hazards and/or unsafe conditions, can capture all the data from EBAS 124D, and can communicate commands to SQMS 122B.

In comparison, the CTDS 122A is based on fault tolerant network time protocol (NTP) clock synchronization with a direct GPS feed. The CTDS 122A has internetworking capability to interface all the field devices. The CTDS 122A can synchronize all field devices with the same time stamp point.

The workflow generator interface system (WGIS) 121A can develop, add, delete, and modify workflows for asset use and resource management. For example, the interface workflow may merge seamlessly with communication systems such as email, wired phone, mobile phone, and other web-interface communication systems.

The real time visualization progression (RTVP) 121B can display real-time build out activities program. For example, the RTVP 121B may superimpose build out 3D image with the real-time progress feed. The RTVP 121B may provide dashboard and reporting capabilities on both construction progress and safety behavior metrics. The RTVP 121B may have the capability to detect schedule and geometric mismatch between the real-time captured 3D module and the 3D planned design. The RTVP 121B may include software interface capabilities (Application Programming Interface, e.g., API) to connect with other databases locally or in wide area network. The RTVP 121B may have the capability to communicate with DABS 124F and/or EBAS 124D to request camera movement, robot/drone dispatch, and manual data entry.

The safety and quality monitoring system (SQMS) 122B can be embodied as a construction project quality monitoring system (CPQMS) and a construction project safety monitoring system (CPSMS). In case of the CPQMS, SQMS 122B can project construction progress visualization through the creation of 3D models from videos and imagery taken either by ground CCTV systems or aerial photogrammetry such as from drones. The data from the 3D models are correlated with asset construction progress from resource management. This can include 2D engineering tools, materials management, project controls, scheduling systems, and video and analytics systems. The SQMS 122B can provide 3D scanning to capture the construction status and verify it against the design basis in the 3D model to ensure that future construction and operation will proceed smoothly and identify any quality issues as early as possible. The SQMS 122B can provide true 3D model from a circular aperture or multiple single aperture, with high definition resolution (mm to km), provides active and passive 3D modeling, and allows identification and tagging for industrial equipment. The SQMS may utilize the available data from 3D models, 2D engineering tools, materials management, project controls, and scheduling systems, to ensure that accurate and timely decisions can be made on the most updated information needed for optimized construction planning and execution.

In the case of the CPSMS, the SQMS 122B can include monitoring, detection and notification of workers health, unsafe behaviors and unsafe conditions using data from the available work management systems including access control, health monitoring systems, and meteorological monitoring systems. The SQMS 122B involves acquiring, processing and analysis of CCTV systems video and imagery output. The SQMS provides real-time notifications when a potential safety violation is occurring that is related to workers health, unsafe behaviors and unsafe conditions. The SQMS 122B gathers and integrates data from worker health conditions, meteorological conditions and related site safety requirements. The SQMS 122B can includes worker identification by, for example, providing facial identification (or other biometrics), regulating access authorization to restricted areas, regulating general access authorization whether to allow or deny identified individuals, and creating space safety zones. The SQMS 122B can further monitor worker health conditions including, for example, heat and cold stress conditions, slip and fall incidents, fatigue conditions, man down incidents, overexertion conditions, and fit to drive status, track location, monitor proximity alerts, and create time safety limits (e.g., flagging workers not following minimum resting requirements), and link requirements with meteorological conditions. The SQMS 122B can additionally assist to enforce personal protective equipment (PPE) by, for example, defining PPE safety requirement zones, detecting, safety shoes, safety vests, safety harness at elevated platforms for instance, eye protection, helmet and hard hat, and ear plugs. The SQMS 122B may further enforce early detection of other workplace surrounding hazards including, for example, falling hazards from elevated platforms or shop-floor surfaces such as slippery surfaces, trip hazards, clutter, leaks, standing water, working at heights, and fall protection gear. Such workplace surrounding hazards may additionally include: electrical overhead travelling crane, and mobile equipment hazards and electrical hazards. The SQMS 122B may additionally identify when a worker shows signs of fatigue; identify blocked fire exits, spills, and over-stacking/blocked sprinkler heads; identify prohibited usage of mobile inside process areas; use tagging to track chemicals, and how long they have been kept, notify when hazardous chemicals are pulled from storage; notify and tack how long an employee enters a confined space, repetitive motion alert, improper lifting form alert; and identify unauthorized vehicles accessing prohibited areas.

The multipurpose sensor network (MSN) 124A includes integrated sensors that have direct and indirect contact sensing capabilities covering people, fixed asset (such as completed buildings), dynamic asset (such as drillings), mobile asset (such as vehicles) and autonomous sensors. The MSN 124A may communicate via wire, wirelessly, or both. The MSN 124A is capable of operating at various temperature and weather conditions (e.g., rainy or dusty weather). The MSN 124A can additionally trigger visual and/or audible notification. In more detail, the sensors can have computing and data storage capability in addition to retaining time and location. The sensors can also be personalized to an operator or worker specific setting.

The people-based sensor (PBS) 124B may include durable sensor and non-reusable sensor. An example of a durable sensor can be an equipment supported by long last power source, digitally operated with contact sensors that has the ability to be personalized and collect human essential health signs, location, movement, direction, and posture. Human essential health signs sensor may be based on direct sensor contact with the human body, hand wrest, chest, and or legs. It can be embedded as part of a wearable uniform and or similar to other personal protective equipment (Hats, Wearable clothes, and portable with connection on demand). Location aware sensor has the ability to keep track of the location based on, for example, global positioning system (GPS) or radio-frequency identification (RFID) positioning system. These sensors generally retain movement and direction and may relay the collected data. An example of a non-reusable sensor includes a sensor made of synthetic material that that can be attached on human to a surface. While such sensors can be discarded, the non-reusable sensors support RFID technology and are readable by RFID scanning technology. For example, each may be associated with a unique 2D bar code that can be scanned by a camera device.

The fixed asset-based sensor (FABS) 124E can report on location and trigger alarms upon unauthorized mobility. The dynamic asset-based sensor (DABS) 124F can be equipped by video/optical sensor network that keep tracks of its progression. In some instances, the optical/video system will be based on high resolution (60 frame per second). The optical/video camera movement can be based on a control loop feed. The control feed input may be based on detection of a change in construction or predefined schedule. The optical/video system may be capable of wide-angle capturing (80 degrees) field of view, super-wide angle of 180 degrees or higher.

The mobile asset sensor (MAS) 124G may be equipped with a device to capture data on speed, engine health status, operating hours, outage time, parts replacement. The MAS 124G may be networked and location aware of the current position. In some instances, the MAS 124G has 360 sensing capability of other objects within 1 to 15 meters. In these instances, the MAS 124G may incorporate a control loop based on feedback input from other assets of approaching objects and trigger alarms to prevent direct contact with other objects.

The event based autonomous sensors (EBAS) 124D may be equipped by video/optical sensor network mounted on autonomous robotics and/or drones. In some cases, the optical/video system is based on high resolution (60 frame per second). In these cases, the EBAS movement can be based on a control loop feed with autonomous maneuver algorithm/AI. The control feed input is based on a request from PBS 124B, FABS 124E, DABS 124F or MAS 124G, predefined schedule or manual dispatch. The optical/video system may be capable of wide-angle capturing (80 degrees) field of view, super-wide angle of 180 degrees or higher.

The traffic scanner system (TSS) 124C can scan people, tools, and assets. In some cases, the TSS 124C include scanners that are positioned based on the build out structure pathways. In these cases, the scanners are connected to alarm and sound system that will be trigged by the object movements with corresponding sound or message. Each scanner may include local computing and data storage capabilities, can communicate wirelessly or in a wired manner, and can read data via RFID or NFC communication technology.

Figure 2A:
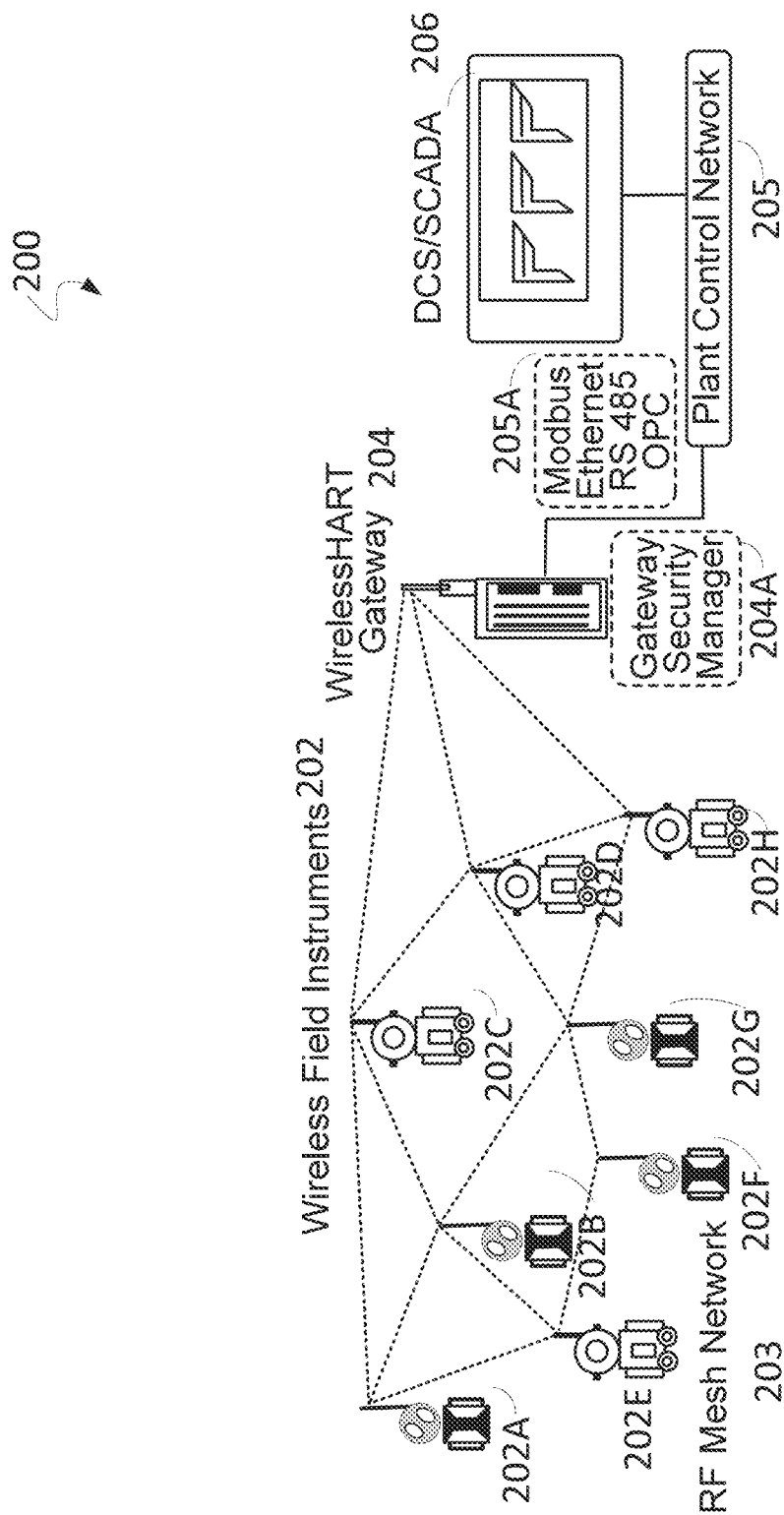
FIGS. 2A to 2C illustrate examples of a Wireless; Wireless ISA, Long-Range Wide Area Network (LoRaWAN), and or $5^{th}$ Generation and or subsequent Generation Wireless network architecture according to implementations of the present disclosure.

Implementations described in the present disclosure can provide seamless integration with plant automation systems of an industrial plant, enabling it to receive commands and respond to alarms and system alerts. As illustrated in FIG. 2A, an example of a Wireless, Wireless ISA, Long-Range Wide Area Network (LoRaWAN), and or $5^{th}$ Generation Wireless network architecture 200 can include wireless field instruments 202 (further including instruments 202A, 202B, 202C, 202D, 202E, 202F, 202G, and 202H that form a RF mesh network 203), and a Wireless gateway 204 on a plant control network 205 (e.g., through interface 205A that includes Ethernet). The plant control network 205 may operate a DCS (distributed control system) that emphasizes process-level operations, or a SCADA (supervisory control and data acquisition) that is event-driven and prioritizes data gathering (206). For example, A DCS delivers data to operators, and at the same time, a SCADA concentrates on the acquisition of that data. The Wireless gateway 204 may operate a gateway security manager 204A. The Wireless gateway 204A may include three main functions, namely, access point, radio, and manager, in one box serving only one particular area in the plant. As described in the present disclosure, the Wireless network is re-architected so that the "Radio" and "access point" are detached from the controller and managing software. The access point are distributed throughout the plant and are connected back to "one" controller serving the entire plant facility. The central controller does not only provide wireless connectivity management but also provided wireless power to access point. The process control instrumentation module includes a unified Wireless gateway function embedded in a central controller that interconnects and manages the field receptors.

Figure 2B:
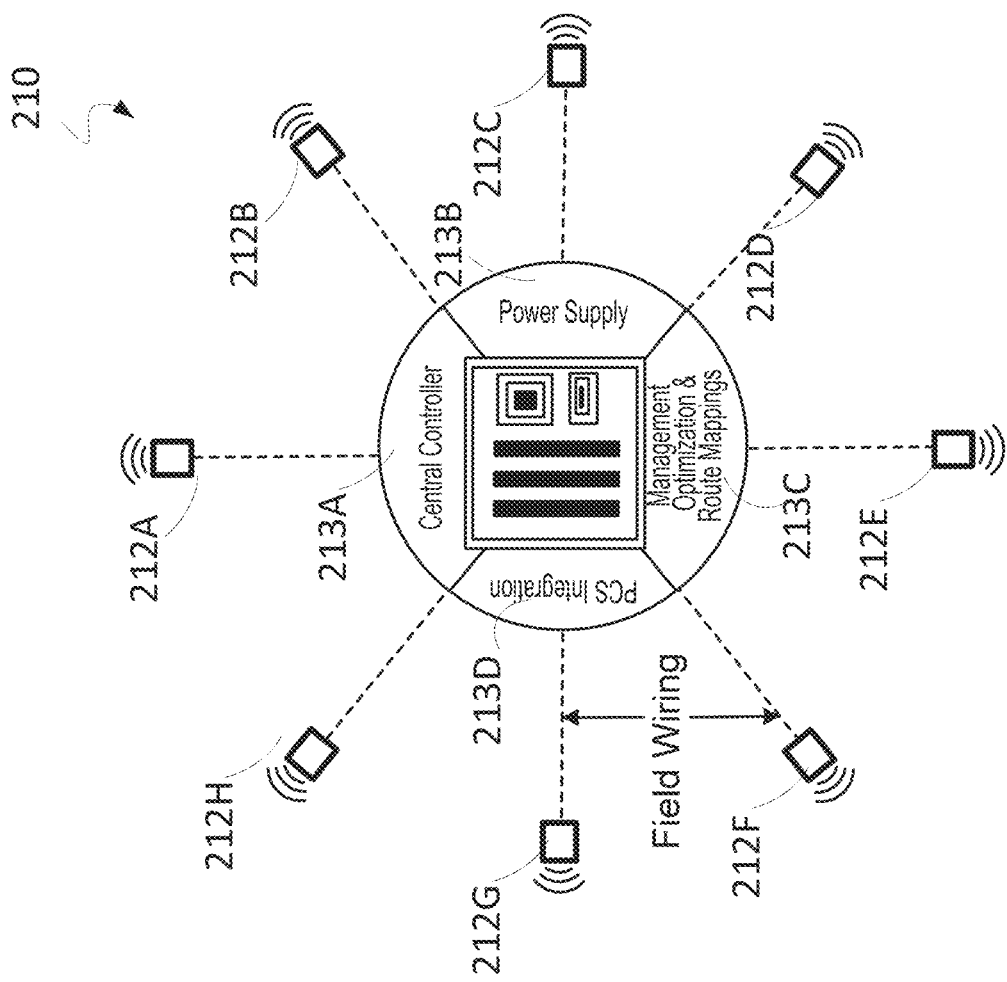

Further referring to diagram 210 from FIG. 2B, the Wireless radio receptors (212A, 212B, 212C, 212D, 212E, 212F, 212G, and 212H) connect the remote field devices utilizing the 2.4 GHZ frequency band. The receptors are connected via physical medium back to the central controller 213A where the unified Wireless gateway is performed. The central controller 213A may include power supply 213B, management optimization and route mappings 213C, and PCS&DM (Process Control System and Data Monitoring) integration 213D. The Wireless gateway thus acts as a unified medium between the Wireless connected devices and the plant network using standard protocols such as Modbus or Profibus.

In some case, the controller comprises a unified Wireless gateway function interconnecting distributed wireless field transceiver using 802.11b/g/n/ac WLAN and converts the HART data to Modbus TCP for easy integration with the plant's control systems. The integration with plant's control systems can be made via an Ethernet port or the integrated controller through which it also connects the various WLAN client transceiver. The data collected from the field Wireless transceivers converted into Modbus TCP before transporting them on the plant's control systems. The controller is configurable and manageable via an embedded secure terminal connection for which detailed system diagnostics can also be made available. The field wireless transceiver is capable of connecting up to, for example, 250 Wireless field devices with the capability of an RF Link relay indication and the ability to measure the strength of the WLAN signal as an analog voltage. The field devices are automatically (dynamic assignment) assigned a Modbus ID to enable it to communicate with the master controller.

Figure 2C:
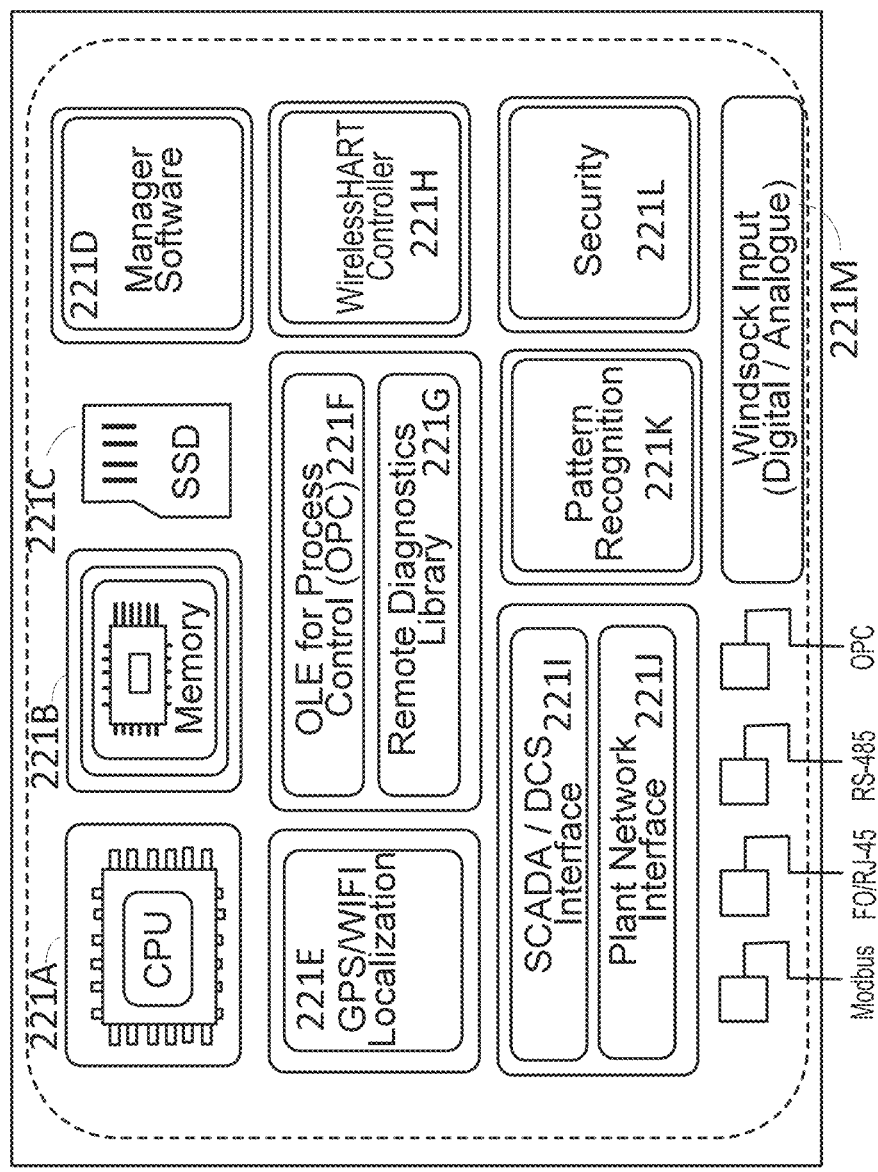

FIG. 2C shows an example of a Wireless gateway 220 to illustrate the unified Wireless controller components according to some implementations. The Wireless gateway 220 includes CPU (central processing unit) 221A, memory 221B, SSD (solid state storage device) 221C, management software 221D (which may include firmware), GPS/WiFi localization module 221E, OLE (object linking and embedding) for process control (OPC) 221F, remote diagnosis library 221G, Wireless HART, ISA, Long-Range Wide Area Network (LoRaWAN), and or 5th Generation Wireless controller 221H, SCADA/DCS interface 221I, plant network interface 221J, pattern recognition 221K, security module 221L, windsock input 221M, in addition to Modbus, RJ45, RS485, and OPC interface connectors. Here, windsocks are used to provide indication of wind speed and direction in analogue or digital representation. Windsocks may be used at petrochemical plant facilities where s risk of gaseous leakage or fire exist. In some windsock implementations, wind speed is indicated by the windsock's angle relative to the mounting pole; in low winds, the windsock droops; in high winds it flies horizontally. The speed of wind is estimated by highly visible orange and white stripes with each stripe adds up 3 knots to the estimated wind speed. For the present disclosure, a digital or analogue output windsock will be used to provide general wind speed and direction which will be used by the emergency route escape mapping procedures to determine the most accessible and safe exit for workers should an emergency occur.

Figure 3A:
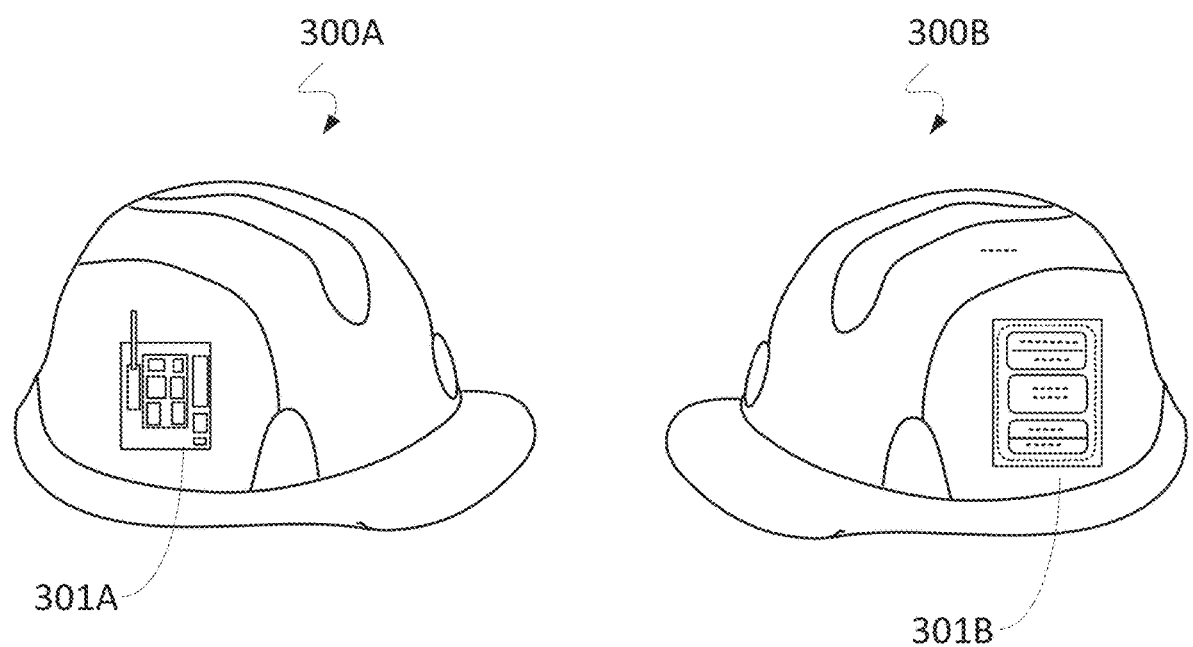
FIGS. 3A to 3B illustrates examples of an intelligent wearable device according to some implementation of the present disclosure.
Figure 3B:
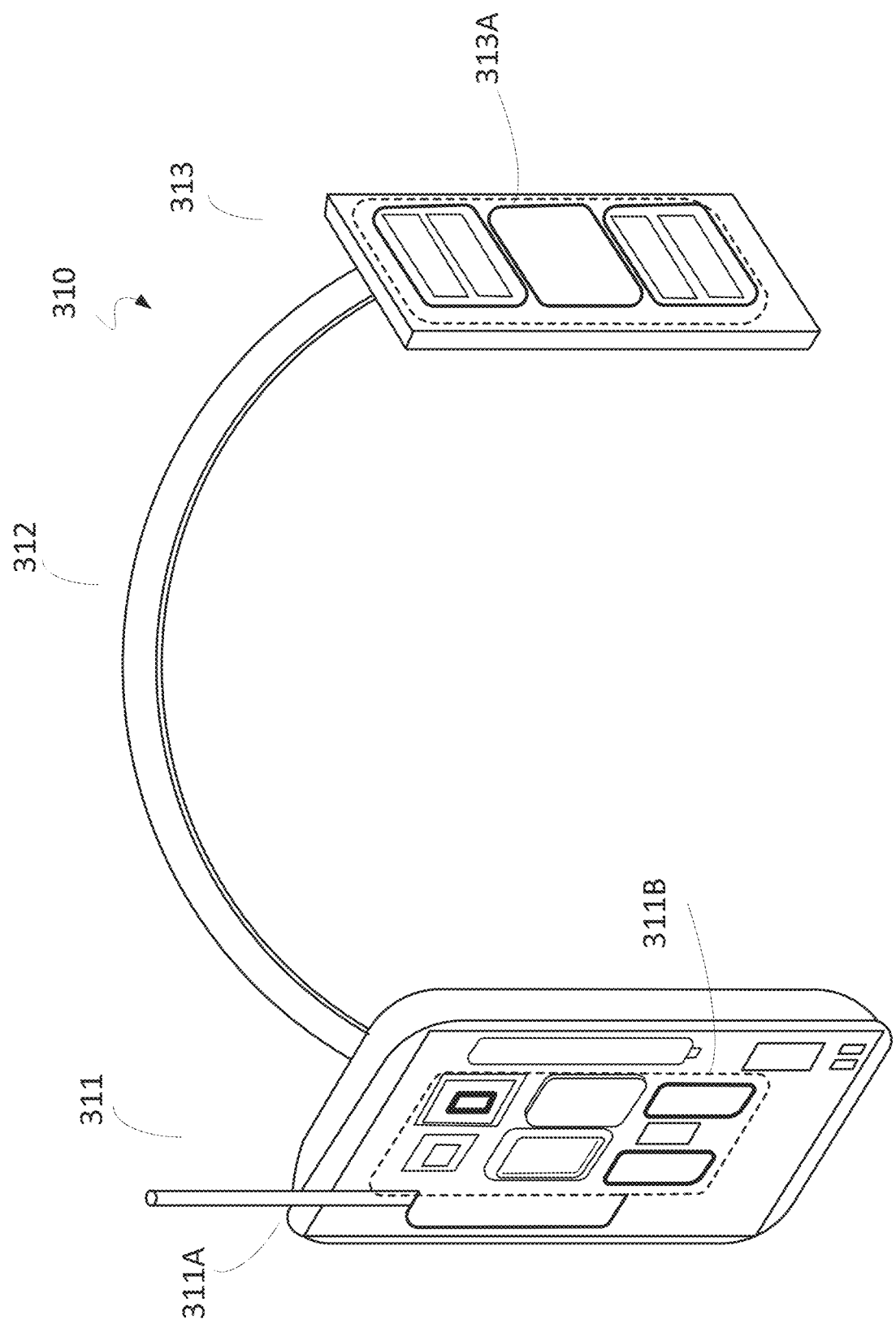

Intelligence Instrumentation will provide the hat (helmet) with hardware/software based technical abilities to perform intelligent functions such as localization and guidance, expanded diagnostics based on pattern recognition and image analysis. Referring to FIG. 3A, an example of a helmet 300A can include a side-mounted intelligent device 301A while another example of a helmet 300B can include a side-mounted intelligence device 301B. The mounting location can be slightly above the ear location. As illustrated in FIG. 3B, an example of an assembly 310 can include a transceiver module 311 that includes antenna 311A and electronics 311B, a connector belt 312, and a terminal 313 that includes touch pad 313A with tactile control. In this example, the transceiver module 311 can be mounted on the outside of the helmet while the terminal 313 can be mounted on the inside of the helmet, for example, closer to the eye. The terminal 313 may also include projector-type of display to be mounted on, for example, towards the forehead region to project a visual display to the operator wearing the helmet. In some cases, the apparatus can support a helmet attached an ultrasound mobile emitter that can be used to scan the outer surface of pipes for potential corrosion or deformation. In these cases, a portable hydrophone can be used to complement the function of the ultrasound emitter from the helmet. In some cases, the apparatus is able to read equipment tag and fetch information related to inventory, for example, supply and spare parts availability/compatibility.

Figure 3C:
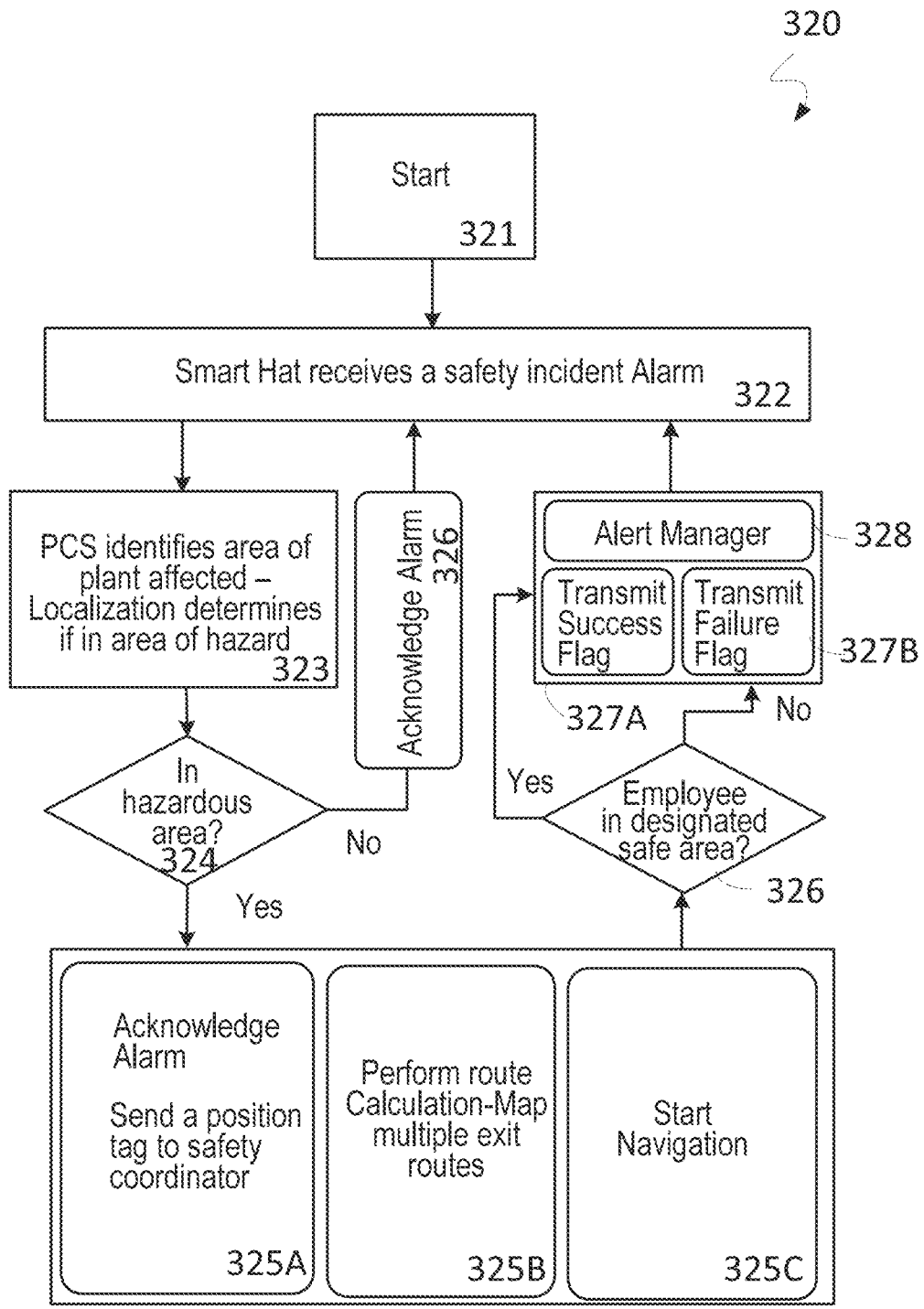
FIG. 3C illustrates an example of a flow chart according to an implementation of the present disclosure.

FIG. 3C illustrates an example of a flow chart 320. The process starts (321) and a smart helmet (or hat) receives a safety incident alarm (322). In response, the PCT identified the area of the plant affected by the incident (323). In other words, the location of the incident determines whether the incident is in an area of hazard (324). If the determination is that the incident is not in a hazardous area, the process may proceed to acknowledge the alarm only (326). If the determination is that the incident is in a hazardous area, the process may proceed to acknowledge the alarm and second a position tag to a safety coordinator (325A), perform route calculation and map multiple exit routes (325B), and then starts navigation to guide the operator to safety (325C). The process may receive updated location from the operator's helmet and determine, in real time the whereabouts of the operator. Based on the location of the operator, the process may determine whether the operator is in a designated safe area (326). If the determination is yes, the process may transmit a success flag to alert manager 328 (327A). Otherwise, the process may transmit a fail flag to alert manager 328 (327B). The alert manager 328 may further communicate with the smart helmet.

Figure 4A:
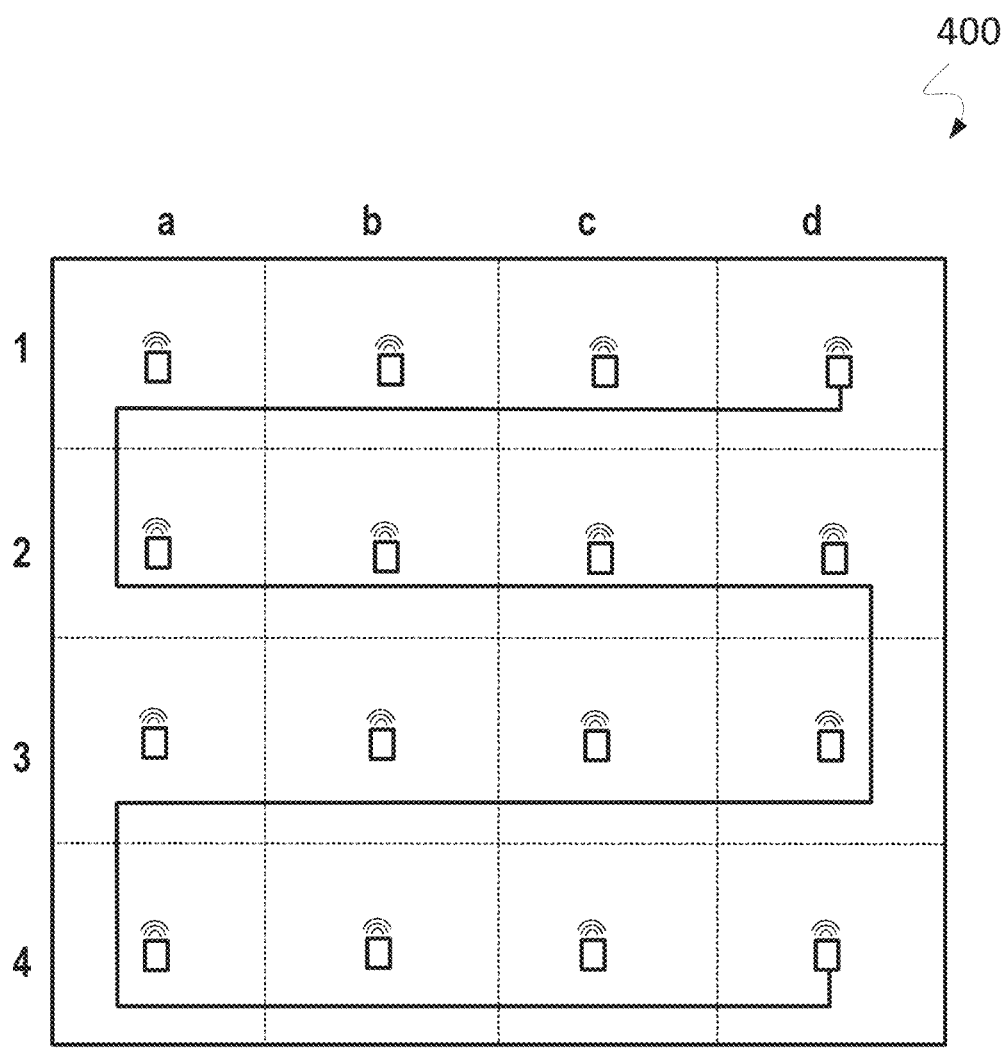
FIGS. 4A-4E illustrate examples of handling an emergency in an industrial plant facility according to an implementation of the present disclosure.
Figure 4B:
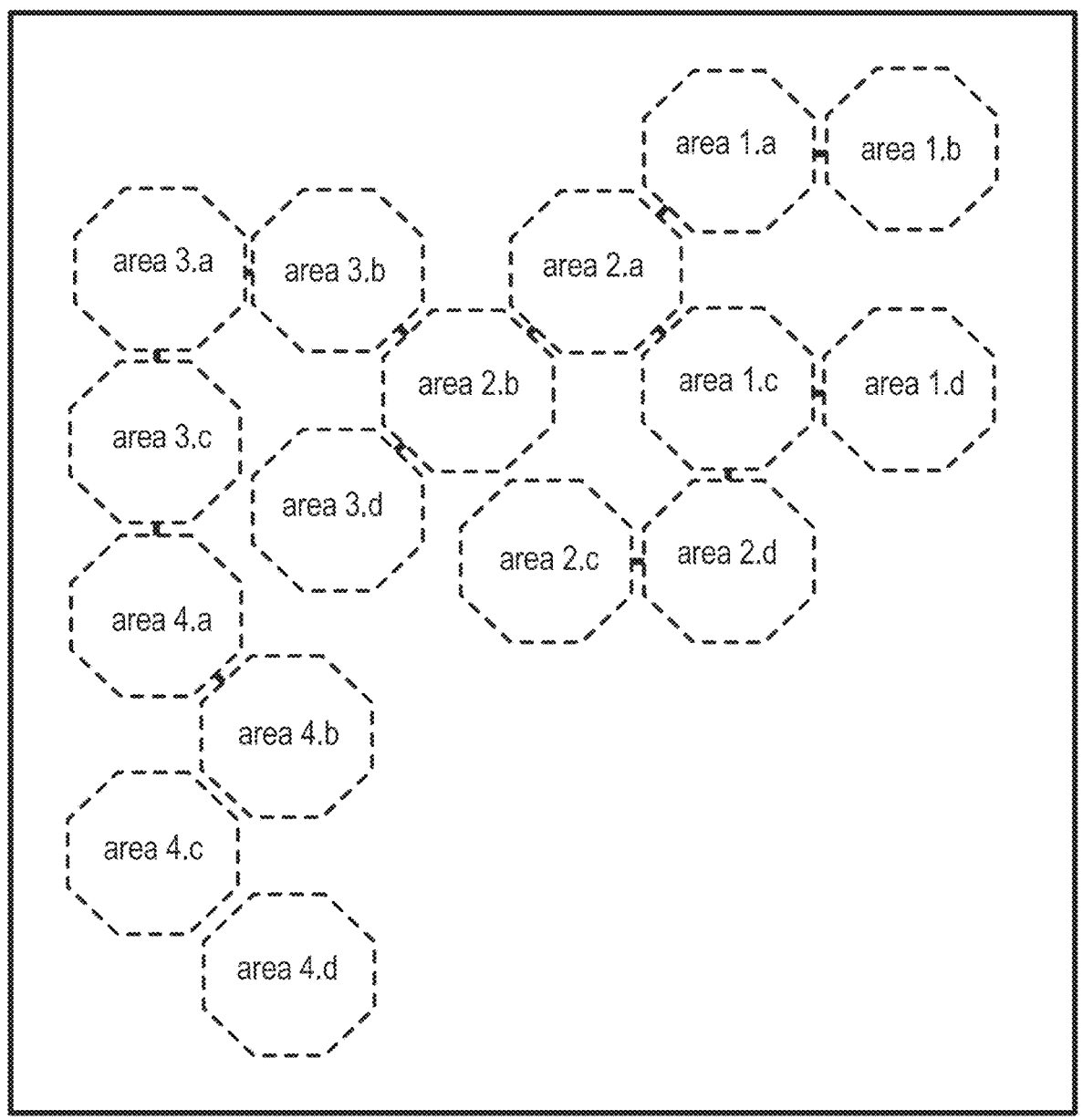
Figure 4C:
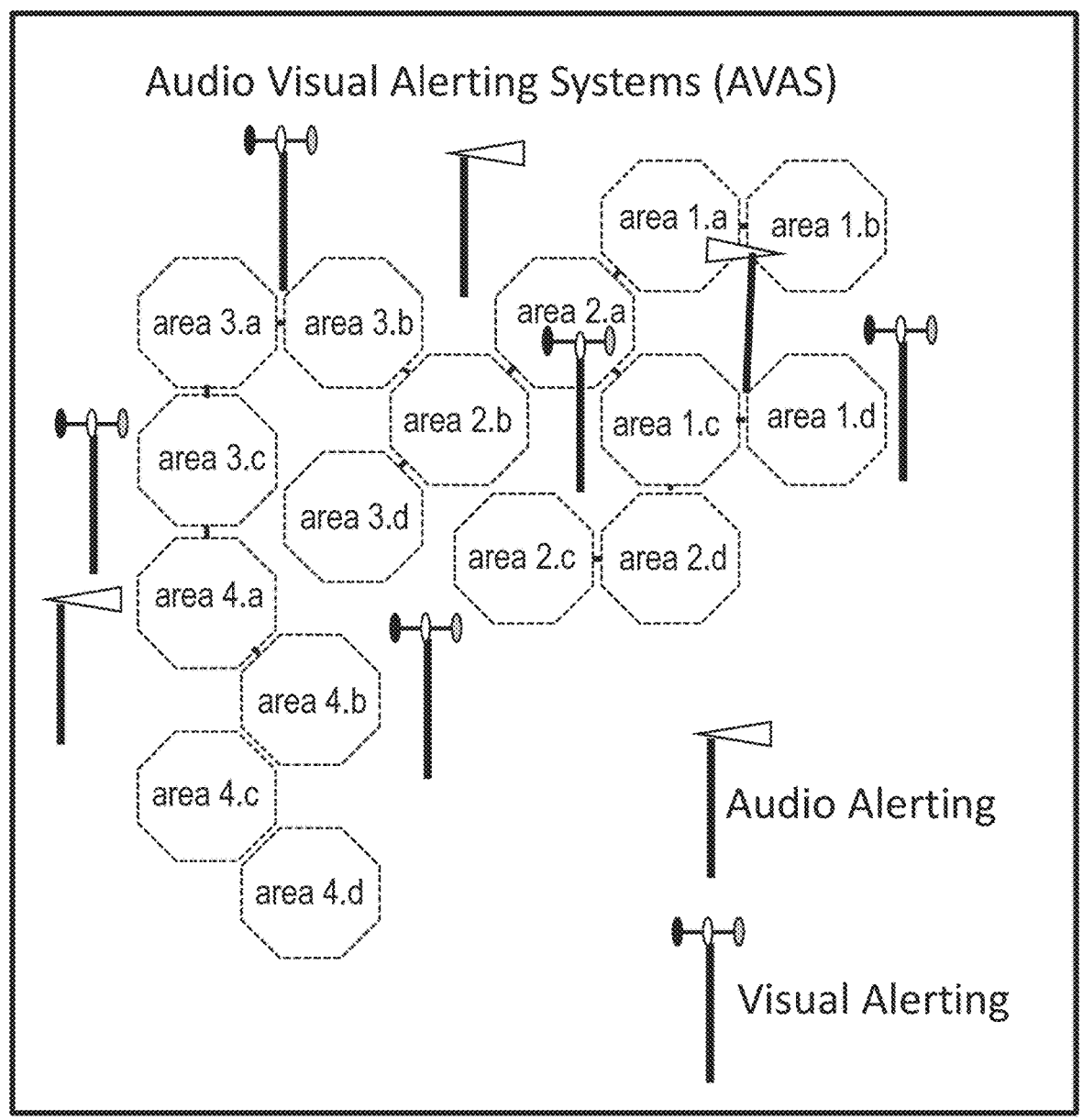

In some implementations, the plant floor is divided into a number of cells or areas of coverage to facilitate adequate wireless connectivity and reliable integration to the process control systems. The areas are defined as part of a matrix with rows and columns so that each cell is addressable by its row and column identifier. As illustrated in FIG. 4A, an example of a plant floor 400 is divided 16 sixteen cells, in rows 1 to 4 and columns a to d. In this example, a receptor, which can operate on the Wireless protocol, is installed in each coverage area whereby the signal quality and propagation is ensured. The receptors are distributed throughout the plant floor and are connected to a central management controller for the whole plant facility. Further referring to FIGS. 4B to 4C, the placement of the receptors, as illustrated by plans 410 and 420, provide coverage for each area marked in hexagonal region, from area 1 (and sub-regions a to d), area 2 (from sub-regions a to d), area 3 (from sub-regions a to d), and area 4 (from sub-regions a to d). The hexagonal cells are grouped into respective areas, each can have its own connectivity or security profile.

Moreover, Audio Visual Alerting Systems (AVAS) is included in each area or region. The AVAS includes signal initiation, transmission, notification, and annunciation in the area designed and installed to meet the levels of performance. The AVAS components (loud speaker and alerting light) are used to complement the wireless Personal Protected Equipment and or Mobile Device communication. The AVAS stations are installed at least 1.5 Meter from the work area ground level of each Area or one or more Area to enable Operator to have a visual and can hear audio. AVAS provides visual alerting and visual systems such as changing color coding: Green=safe; Red=is danger; and flashing amber implies work is in progress). The AVAS Light and Audio stations which consist of amplifiers, junction enclosures, plugs and loudspeakers installed in Area are to be in compliance with area classification (industrial requirements Hazardous and standard building Management). AVAS will imply acoustic safety components in areas where ambient noise levels exceed 80 dBA. The AVAS include a multi-tone generator capable of generating different types of tones for different emergency conditions, such as; yelp, warble, siren, and steady tone.

The controller performs management and administration functions such as security management and controls including authentication and traffic optimization process for connected field devices. The controller also provides route mapping and localization services throughout the plant for which guided escape routes maybe improvised in hazardous events such as gas leaks or fire outbreaks. The controller is connected to all plant distributed receptors via physical mediums such as copper or fiber optic cabling to eliminate or minimize interference and provide robust and reliable system interconnectivity.

Figure 4D:
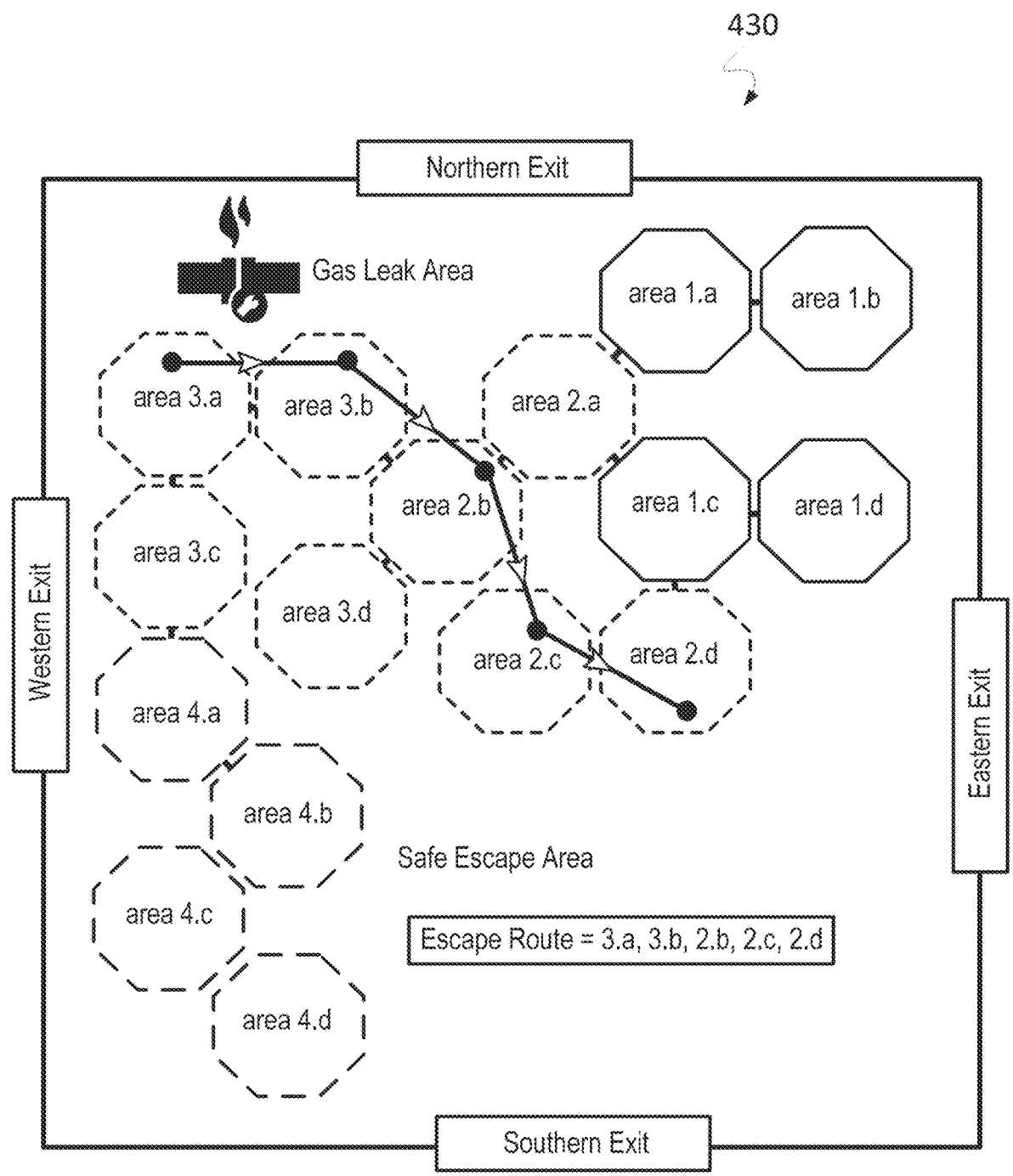

FIG. 4D illustrates a use case 430 of intelligent guidance for escape routes during emergency. As illustrated, a fire breaks out due to gas leak in an area close to the northern exit. An operator, for example, an employee operating on-site is notified of the emergency right away. Here, the controller may calculate an escape route based on real-time information from the various sensors at the plant. In this illustration, the computed escape is from area 3.a to area 3.b, then to area 2.b and to area 2d, and finally to area 2.d. The escape route can be computed to optimize the fastest route to a safety area, or the fastest time to an exit. In some cases, route computation is based on a static escape route plan which is defined as a result of the risk assessment (e.g., what if scenarios). Based on a risk event location, the route is displayed to the individual communication media (e.g., tablet, radio, phone that may be mounted on the individual's helmet) and the individual select the nearest route.

In some cases, the route can be computed based on captured sensor data (gas leak or fire) that is mapped to the facility floor plan. By superimposing the GPS location of the individual to the sensor data, an escape routed is identified and communicated to the person communication media (e.g., tablet, radio, phone that may be mounted on the individual's helmet) and the individual select the nearest route. As the individual progresses along the way, the routing information may be updated, for example, when the individual misses a turn, a better route emerges, or a new emergency occurs.

In various implementations, the escape route may be based on an algorithm with streams of input from multiple sensors. The sensor input can originate from body held sensing that could provide information about individual wearing the PPE (personal protective equipment) such as body temperature, heartbeat, perspiration rate etc. The sensor input can also come from plant instrumentation and control systems such as gas or chemical leaks, pressure spikes etc. The sensor input can also come from environmental such as wind speed and direction. The combined information is then augmented by localization information obtained from SSID (service set identifier) association throughout the plant for the most logical (e.g., fastest or closest) exit route that will insure the safety of the worker. Generally, it is preselected based on risk evaluation (e.g., in what if risk scenarios) or based on real-time sensor data correlation to the individual location, or a combination of both thus giving the individual the choice to select the suitable escape route.

Figure 4E:
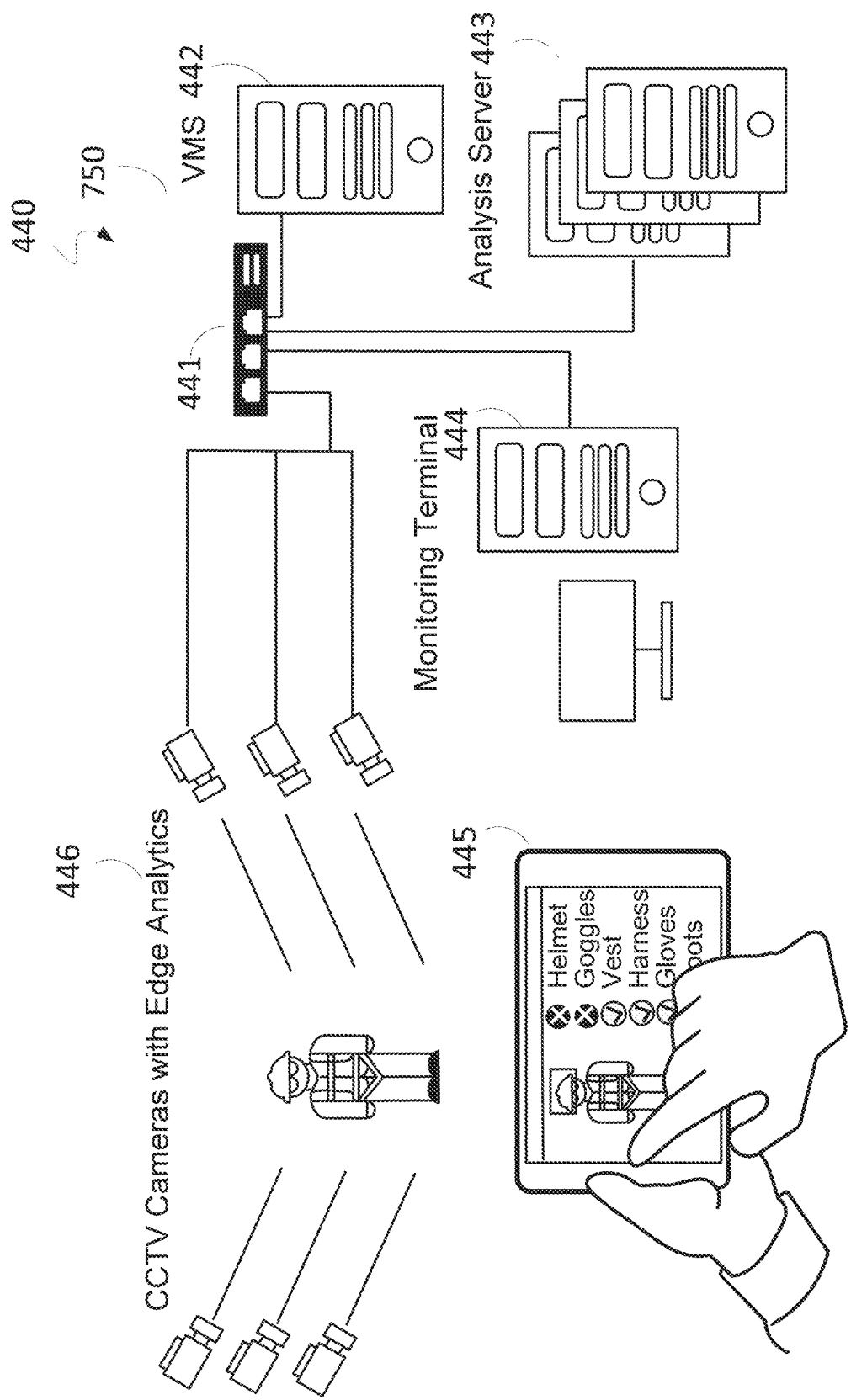

Further referring to diagram 440 from FIG. 4E, an edge analytics platform 400 is provided to generate real-time routing information. Platform 400 includes network switch 441 providing connectivity to CCTV camera sensors 446, VMS (Video Management System) 442, analytics server 443, monitoring terminal 444, as well as user tablet 445. In this example, CCTV camera sensors monitor a plant facility to provide real time video streaming. Edge analytics can be derived based on the stream input using a stand-alone computing server 443 or utilizing VMS 442. The edge data analytics is correlated to key performance indicators (KPI) dashboard (e.g., user tablet 445) to achieve accurate worker identification and tracking, zero worker violations, and zero unsafe condition. The KPIs are achieved with high accuracy with no false negatives/positives which may introduce unreliability of the analytics. The edge detection capabilities are based on mapping the individual PPE profile to the actual facility area (zone or segment). The solution provides real-time notifications when a potential safety violation is occurring that is related to workers health, unsafe behaviors and unsafe conditions. The solution is capable of gathering and integrating data from worker health conditions, meteorological conditions and related site safety requirements, as outlined above with respect to FIGS. 1A to 1C.

Figure 5:
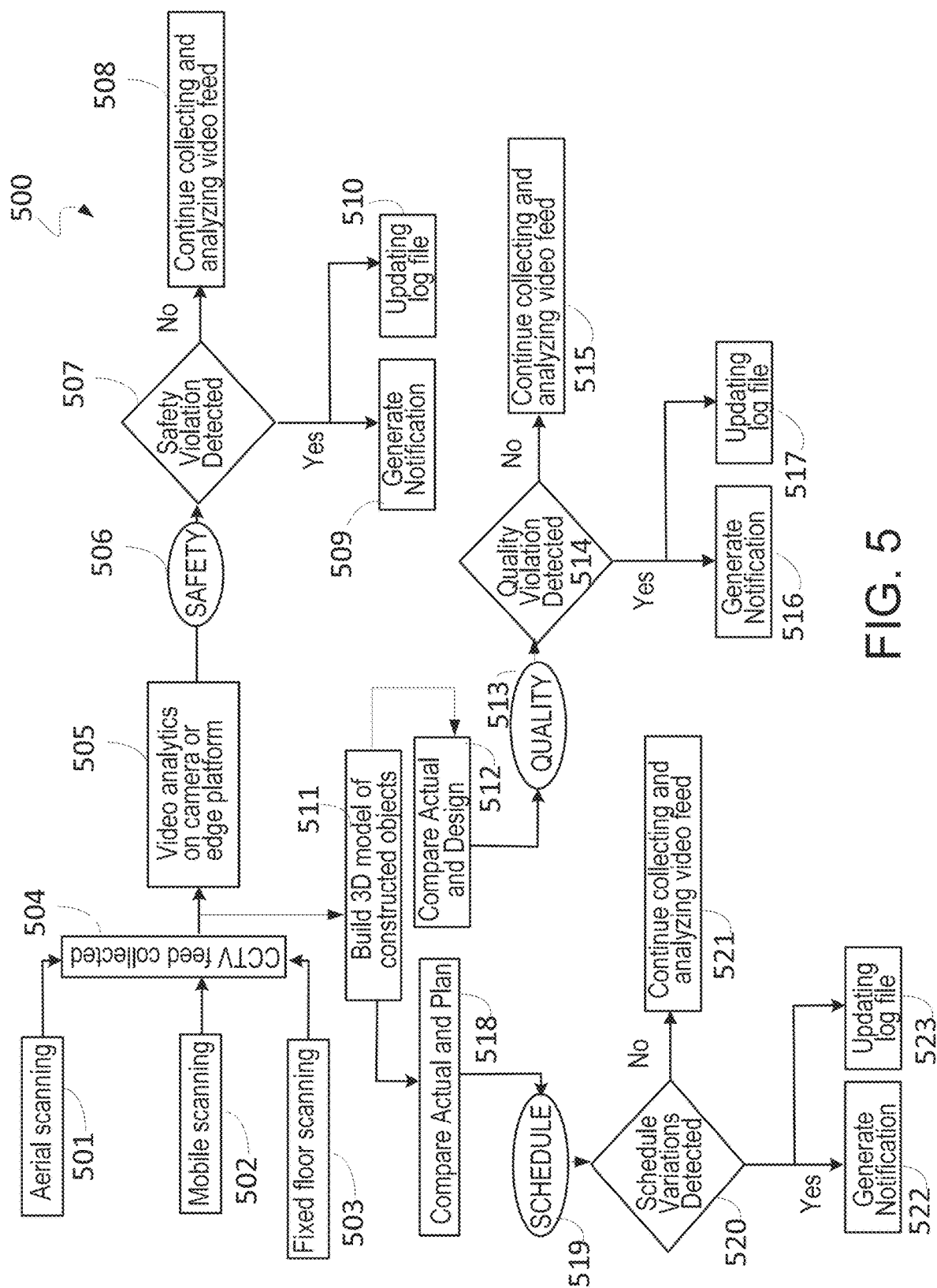
FIG. 5 illustrates an example of a flow chart according to an implementation of the present disclosure.

FIG. 5 is a flow chart 500 illustrating an example of intelligent edge analytics based on some implementations. Multiple streams of sensor input can be collected at CCTV feed (504). These streams of input can include aerial scanning (501), mobile scanning (502), and fixed floor scanning (503). Here, the use of drone will provide aerial imaging (scanning) based on scheduled and unscheduled aerial trips. Based on the image feed from cameras and edge platform, video analytics can be generated (505). The video analytics are evaluated to determine a safety status (506) of the plant operation (507). If a safety violation is detected, a notification is generated (509) and the log file is updated (510). If no safety violation is detected, the process may continue with collecting and analyzing video feed (508). Based on the image feed from cameras and edge platform, 3D models of the constructed objects can be built (511). From this 3D model, a comparison can be made between the actual construction and the planned construction (518). Based on the comparison, a schedule (519) can be inspected to determine whether schedule variations exist (520). If no variations are detected, the process may continue with collecting and analyzing the video feed (521). If variations are detected, notifications are generated (522) and a log file is updated (523). From this 3D model, a comparison can be made between the actual construction and the designed project (512). Quality metrics can be inspected to determine whether there are quality violations (514). If no quality violations are detected, the process may continue with collecting and analyzing video feed (515). If quality violations are detected, a notification is generated (516) and the log file may be updated (517).

Some implementations may provide capital projects (e.g., constructing and maintaining an industrial plant with buildings and supporting infrastructure) with a holistic approach of building and managing the digital twin for new facilities construction. The implementations may include monitoring multiple streams of input data from a sensor network at the industrial plant, determining an event during construction or operation of the industrial plant based on analyzing the multiple streams of input data in real-time. Moreover, the implementations can provide the capabilities of generating notifications and workflows for the complete life cycle of the project construction based on construction site's progressions and distinct events. In particular, the implementations of a digital twin can incorporate correlative sound frequency modeling.

Figure 6A:
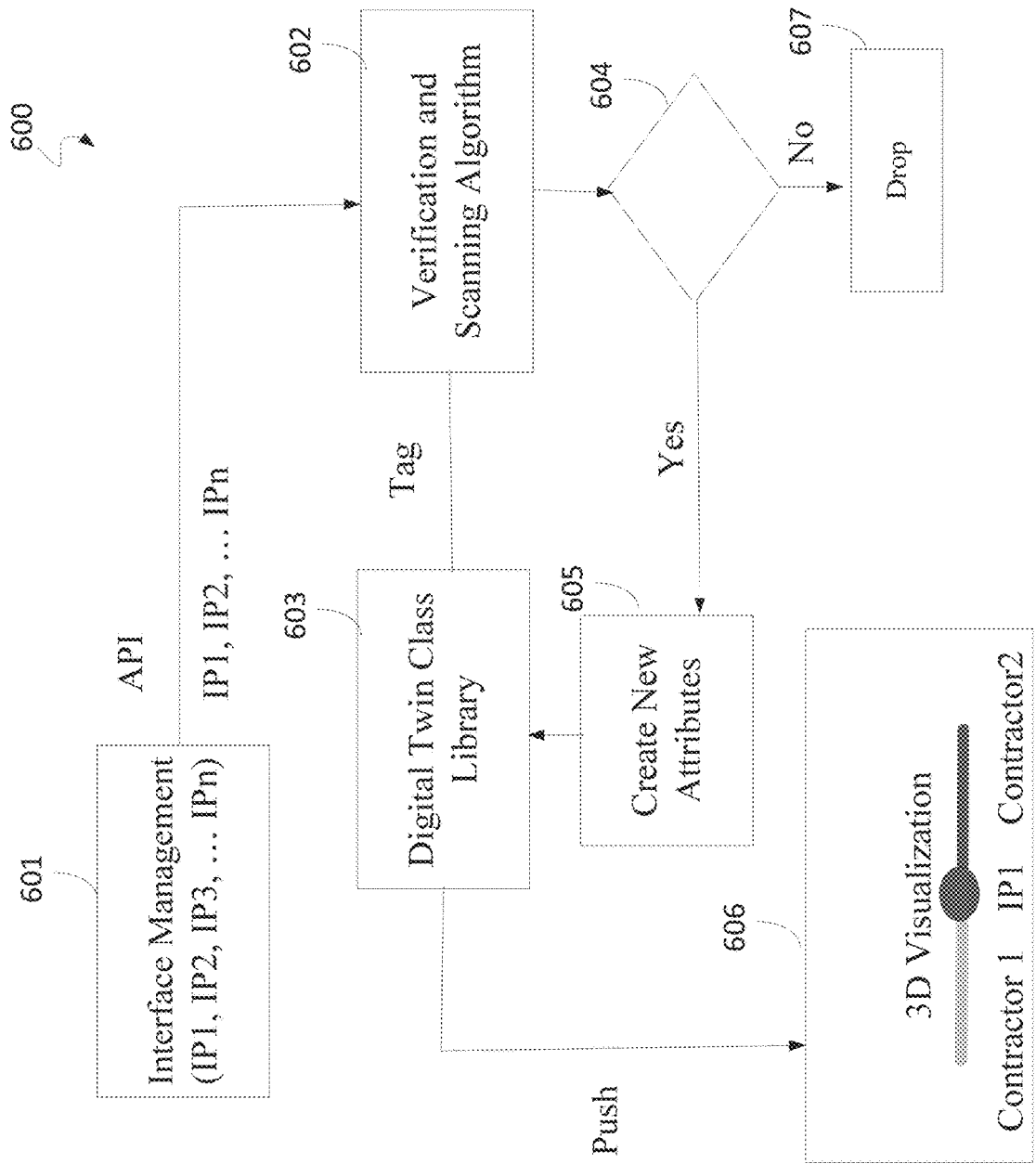
FIGS. 6A to 6B illustrate additional examples of flow charts according to some implementations of the present disclosure.

FIG. 6A is a diagram 600 illustrating an example for migrating and mapping an interface point in an interface management system to the corresponding structure in a digital twin (e.g., the ICDIT of FIGS. 1A to 1C). The interface point in project management may refer to a point of connect between various project execution agencies working on a common project. This point can include a physical interaction between components, functional requirements between systems or contractual interactions. This point of connect can also include a device with a software interface based on computer logic with communications capability utilizing standard-based software and database application protocols. In some implementations, the point of connect can function as an interface for data and control communication, such as, for example, an Application and Database interface. The Application and Database interface can include, among others, the IP addresses of the source and destination devices, the communication port(s) for importing data, and the database protocols such as an Oracle database, a SQL database, a python database. By way of example, some implementations may integrate an interface management system with a digital twin engine through API (application program interface) interfaces. An example of an interface management system is Coreworx, which has an interface Connect that facilitates formal alignment between contracting parties at interfaces on large capital projects that constitute a digital twin. In some cases, the interface Connect can manage the communication and activities required to define and control scope delineation, track all interface requests to completion, and keep key stakeholders informed as the large capital projects are executed. The interface management system can have pre-defined rules governing interface points (IPs) between different executions agencies (e.g., engineering and construction contractors). For example, the pre-defined rules can include programmable rules to systematically maintain the consistency and integrity of interface points between Executions Agencies sharing this point. For example, the process and pipeline data of Contractor A is matched to the process and pipeline data of Contractor B sharing the same interface point. These IPs can be unique in attributes such as "Names" and "Descriptions," so that the present disclosure can migrate and map these IPs to their respective "Tags," "Description," or class library in a corresponding digital twin. Consequently, the "Engine" of the digital twin can create a rendering of a 3D model on the platform, and identify the mapped IPs on the rendered 3D model. A digital twin engine may incorporation modules that implement algorithm to verify the accuracy of the mapping of the interface points (IPs) migrated from interface management to their relevant Tags in the digital twin class library. The logic may be defined as:

IF Interface Management System (IPXX) (Tag Number)
=Digital Twin Class Library (Tag Number),
THEN Create New Attribute (IPXX (Tag Number))

In this example, IPXX is a unique interface number for each of the interface points identified in the projects.

An interface management system 601 may manage a number of interface points (IPs), for example, IP1, IP2, IP3, . . . , IPn. The interface management system 601 may provide API interfaces for each of the interface points, namely, IP1, IP2, IP3, . . . , IPn. Some implementations can provide modules that implement verification and scanning (602) that verifies, e.g., the Tag attribute of an interface point (IP) of an execution agency against a digital twin class library 603. In some cases, IP1, IP2, . . . , IPn can have several attributes including, for example, process data, pipeline data, and instrumentation data. The scanning can parse the IP attributes so that the IP attributes can be recast into corresponding class library formats, and the verification can validate the consistency and integrity of the IP attributes in comparison to Digital Twin class library. The verification may include switch 604. The verification can reject the import if deviation is detected. For example, if the verification and scanning passes, then the process proceeds to create a new attribute in the digital twin class library (605). If the verification and scanning does not pass, then the process proceeds to drop the particular IP from the execution agency (607). In this manner, the execution agencies can migrate and map interface points (IPs) to the class library of a digital twin. Thereafter, by a "push" action which includes, for example, publishing data, inserting new data, new finding, or flags into the database (e.g., the one or more databases made available on LNTC 123 as depicted in FIG. 1C, the digital twin engine may identify the mapped IPs on the rendered 3D model when the rendering of 3D model is created on the platform (606).

Figure 6B:
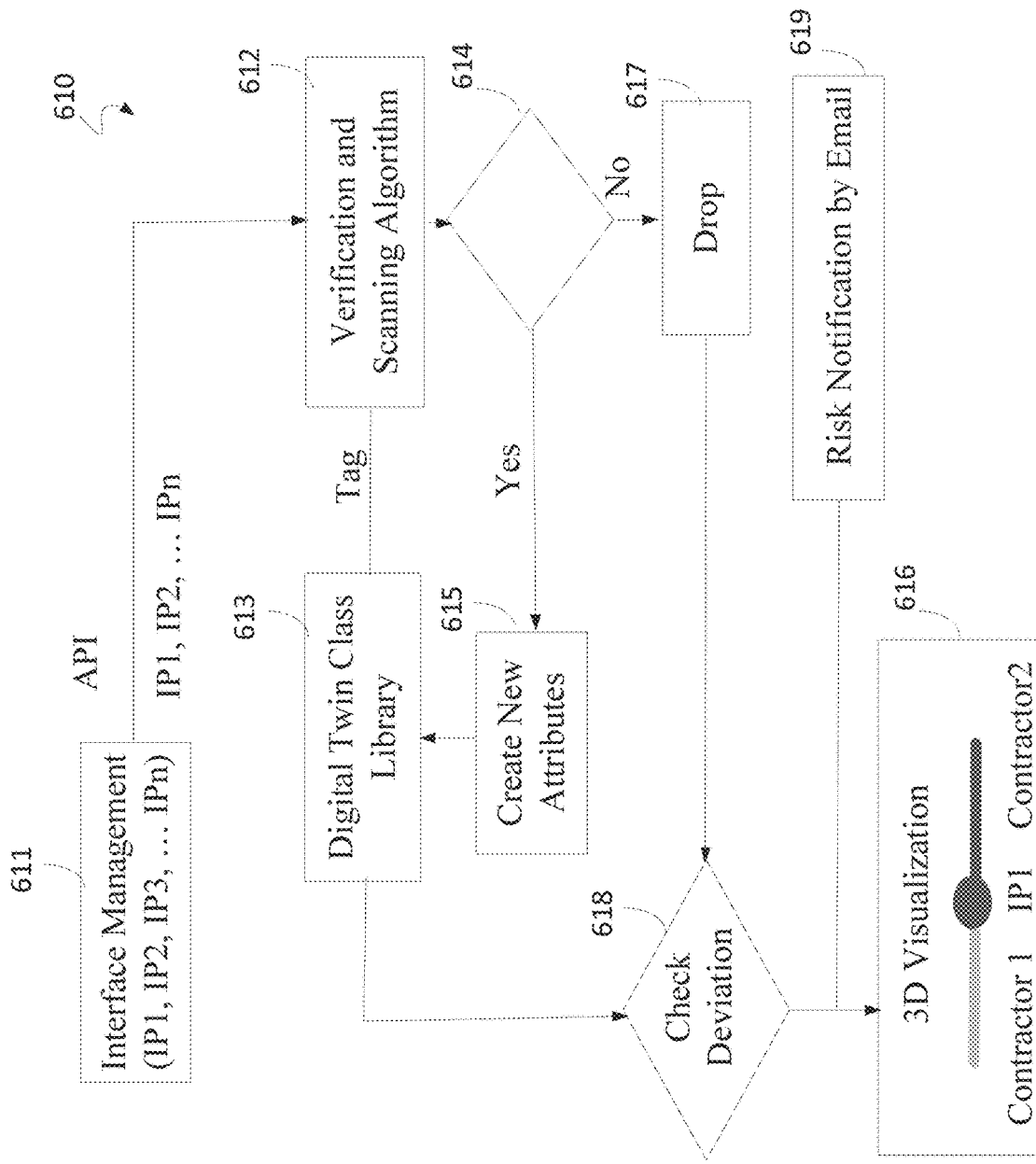

FIG. 6B is a diagram 610 illustrating an example for identifying deviations of IPs between different execution agencies. Similar to interface management system 601, interface management system 611 may also manage a number of interface points (IPs), for example, IP1, IP2, IP3, . . . , IPn, by providing API interfaces for each of the interface points. Interface management system 611 may also provide modules that implement verification and scanning algorithm 612 and switch 614. If the verification and scanning passes, then the process proceeds to create a new attribute in the digital twin class library (615). If the verification and scanning does not pass, then the process proceeds to drop the particular IP from the execution agency (617). The process may check deviations of IPs between different execution agencies (618). In some cases, the check can verify all attributes of an IP of a first execution agency (e.g., a first contractor) against the attributes of the same IP of a second execution agency (e.g., a second contractor). The verification can be executed with preset rules and scope defined in the interface management system 611, and migrated to the digital twin rules engine. Once the risk is identified, the IP can be flagged as a risk. The attributes to be checked can include material specifications, size, classes, materials, and schedule. A logic expression for the operation may be expressed as.

IF Execution Agency 1 (IP1 (Tag #(attribute (Material)))) !=Execution Agency 2 (IP1 (Tag #(attribute (Material))))

THEN Change Color IP1 to Red & Flag Deviation Type (material specs, size, classes . . . etc.)

Some implementations may support an automated notification system (ANS) when IPs scope deviation is detected between different execution agencies. Referring to FIG. 6B, the notification can be sent through an automated email or other message delivery systems, to the client project engineers, the interface manger system 611, or the assigned project engineers of the execution agencies. The notification email can be sent (619), which can include a snapshot (616) of the 3D model showing the identified IP risk (e.g., deviation), relevant scope and rules of this IP according to the interface management system 611, the identified deviation (e.g., in terms of material specification (such as, e.g., metallic, non-metallic, carbon fiber), size, classes, material operational rating (such as, e.g., hydrocarbon (oil, gas), water, utilities air)), and risk calculation based on the number of interdependencies to this IP. For example, the risk for an IP with deviation can be calculated as the number of interdependencies of other IPs on the IP. The interdependency on a given interface point refers to the instance when another interface point uses the given interface.

By operating the IP management system to intelligently manage the IPs, implementations can provide an adaptable and scalable approach to accommodate the inclusion of a plethora of executing agencies that cooperate in a large-scale project. Even though the material usage and operating schedule may vary dynamically between these executing agencies, the implementations can provide a seamless adapter to merge the data (including control data) from these executing agencies so that the integrated digital twin (e.g., the ICDIT of FIGS. 1A to 1C) renders the large-scale project with improved fidelity and accuracy for example, by virtue of the rules governing interface points that bridge communication between the two or more execution agencies. In various cases, the rules can operate to identify, for example, inconsistencies in scheduling and inventory requirement. Significantly, the seamless adapter improves the simulator of the ICDIT in terms of speed and accuracy.

Figure 7A:
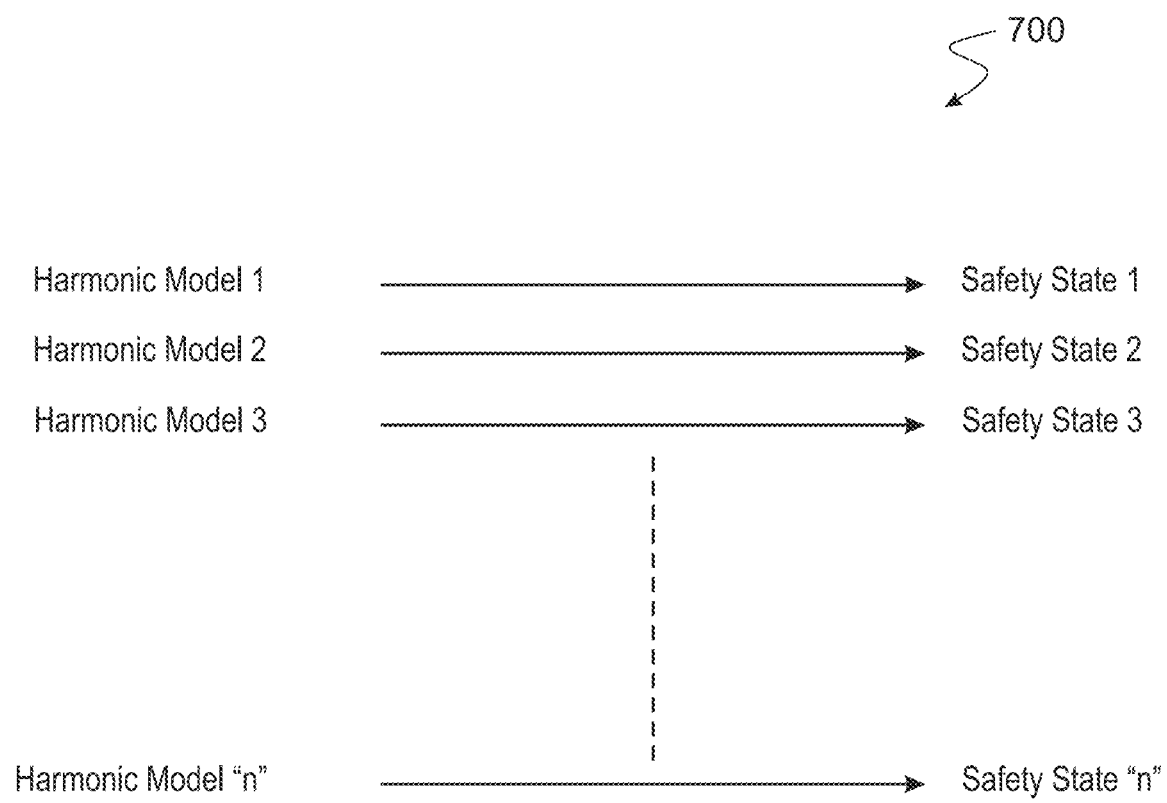
FIGS. 7A-7H illustrate examples of sound frequency modeling according to some implementations.

Referring to FIGS. 7A to 7H, some implementations may implement a microsound harmonic model using pre-shaped cavities. The implementations may include a system to provide correlative sound frequency modeling digital twin of the plant. The model may operate by collecting microsound wave generated by pumps, gas compressors and other machineries colliding against the carved cavities in the meter inner walls with a certain frequency and amplitude. The produced sound wave over a time unit represents a "fingerprint," representing a unique harmonic model specific to the shaped cavities and the velocity. Such microsound can then be recorded and memorized for wide range of frequencies and velocities to generate a finger-print for intended process areas in the plant. FIG. 7A shows an example of diagram 700 illustrating the alignment between individual harmonic models (e.g., harmonic models 1 to n) with respective safety states (e.g., safety states 1 to n). As illustrated, the safety states represent characteristics of operating the plant under safety guidelines. The implementations can build and train harmonic models that correspond to respective safety states.

In one example, a head unit assembly mounted on upstream and downstream pipes, lines equipment can "listens" to the sound signature of operation. This sound signature may be categorized and transmitted over a wireless network (e.g., a 2.4 GHz GSM network) to a central server for data analytics. The data analytics can determine the baseline for "normal" operation.

Figure 7B:
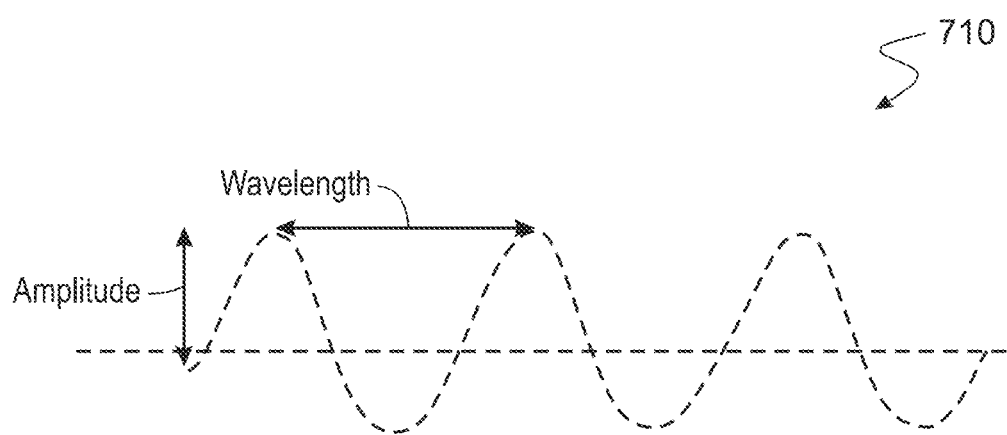

In some implementations of the sound frequency digital twin, the implementations may analyze sound frequency modeling patterns generated by all process areas in the plant through the systematically carved irregularities on the inner walls of the sound collector and thus mapping (correlating) the analyzed scheme to a pre-stored velocity, and eventually estimating normal operation mode. In these implementations, sound frequencies are the systematically gathered to create predicted microsound harmonic model associated with a normal operation of a given process area. FIG. 7B shows an example of a microsound trace 710 recorded in a process area of a plant.

Some implementations may aim at establishing a performance framework rather than detailed fabrication/production data. For example, the implementations may use a sound collector and analyzer to inferentially correlate a to-be-measured variable based on an associated phenomenon. In one example, the correlation may include correlating the flow velocity with the mechanical vibration of the resonant coil. The correlation process of some implementations may be based on empirical testing rather than detailed mathematical computation (e.g., based on formalism). The collector can be initially tested under lab conditions with the aim of identifying a performance curve that establishes the relation between the measured variables and the resulting sound across the collector's operational range. This analysis can be done at different testing conditions covering the range of variables impacting the meter performance such as, for example, temperature, density, pressure, and viscosity.

Figure 7C:
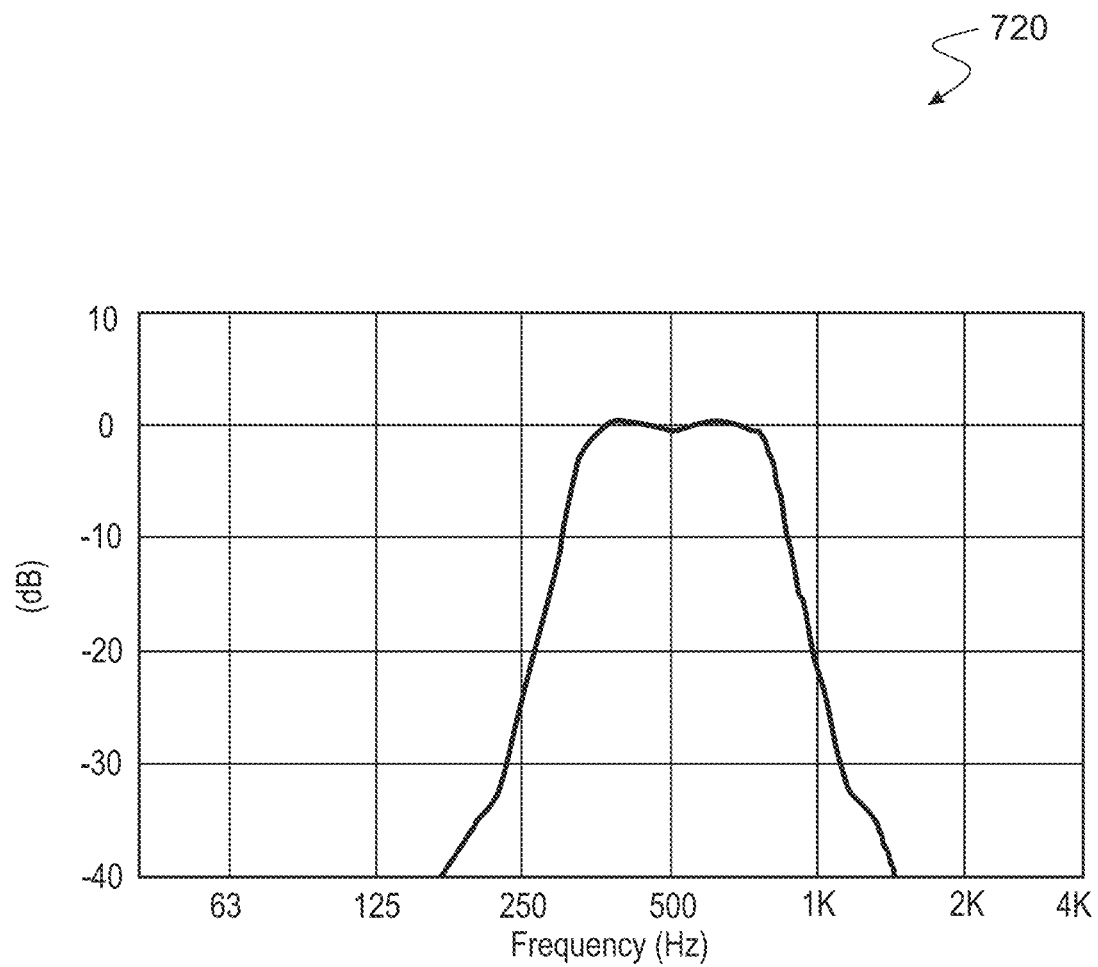

FIG. 7C shows an example of the spectrum 720 of a recorded microsound. Some implementations can give rise to a variety of different rates or frequencies as the waveform's amplitude increase in relationship to the resonant frequency of the cavity. On this note, the irregularities in the cavity change the shape of the surrounding of the cavity and thus the resonant frequencies, thus allowing wider range of sound frequency to represent variable operational models. To protect the collector's inner engraving for possibility of erosion, corrosion resistant alloy (CRA) plating can be used to overcome the potential shortcoming. Implementations incorporating correlative sound frequency modeling collectors can use microsound frequency receptacles at the end of each of those irregularities, thus measuring sound pulses and creating a frequency model or "footprint" that is analyzed and correlated against a predicted laboratory prepared scheme to estimate the normal operational mode of the plant.

Figure 7D:
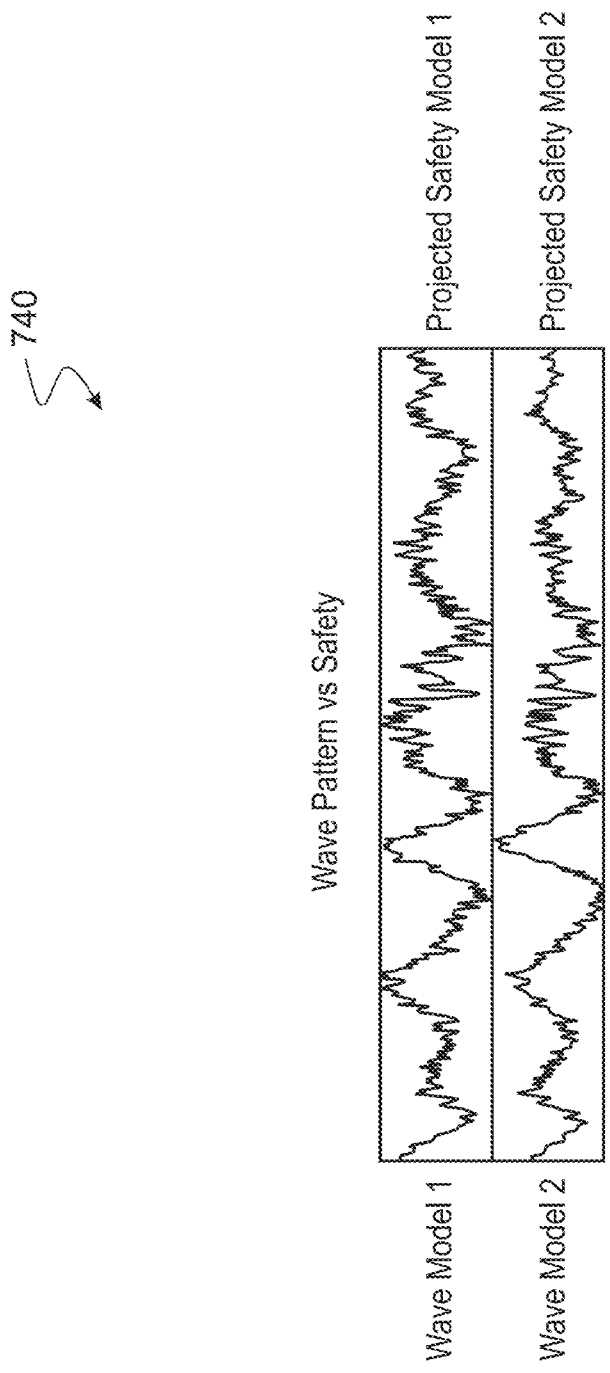

The frequency models can be calculated and pre-determined in laboratory, given the uniqueness of the frequency models generated by the unique shaping of the irregular inner pipe surface. FIG. 7D shows an example of diagram 740 illustrating two recorded wave patterns. The differentiation in pattern may reveal two distinct wave modes (e.g., wave mode 1 and wave mode 2), along with the respective projected safety modes (e.g., projected safety mode 1 and projected safety mode 2).

Figure 7E:
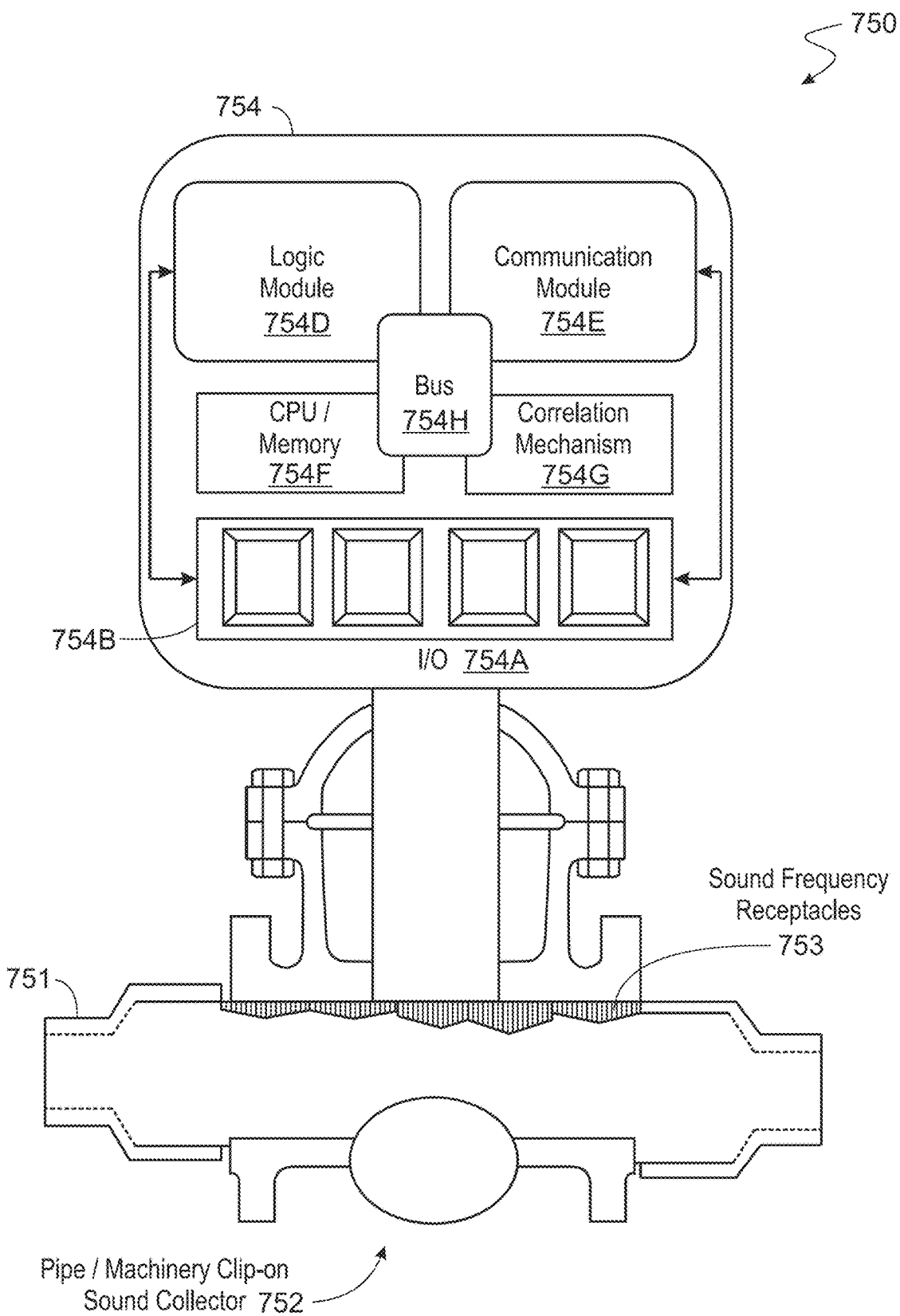

As illustrated in diagram 750 of FIG. 7E, pipe 751 in an industrial plant can be fitted with a variety of sound collectors, e.g., clip-on sound collector 752 and sound frequency receptacle 753. Controller 754 can then record the collected sound waveforms. In some cases, controller 754 is a local controller and the recorded sound waveforms can be relayed to a central controller as illustrated in, e.g., FIG. 2B. Clip-on sound collector 752 and sound frequency receptacle 753, along with controller 754 can provide a sensor network in communication with a local network traffic concentrator as illustrated in, for example, FIG. 1C. Controller 754 can include I/O port 754A to interface with clip-on sound collector 752 and sound frequency receptacle 753, and indicator 754B to provide information (e.g., status information) to an operator. Controller 754 can additionally include logic module 754D, communication module 754E, CPU/memory 754F, correlation mechanism 754G (e.g., FPGA module as further discussed in association with FIG. 8), and bus 754H that connects the various modules and mechanisms.

Figure 7F:
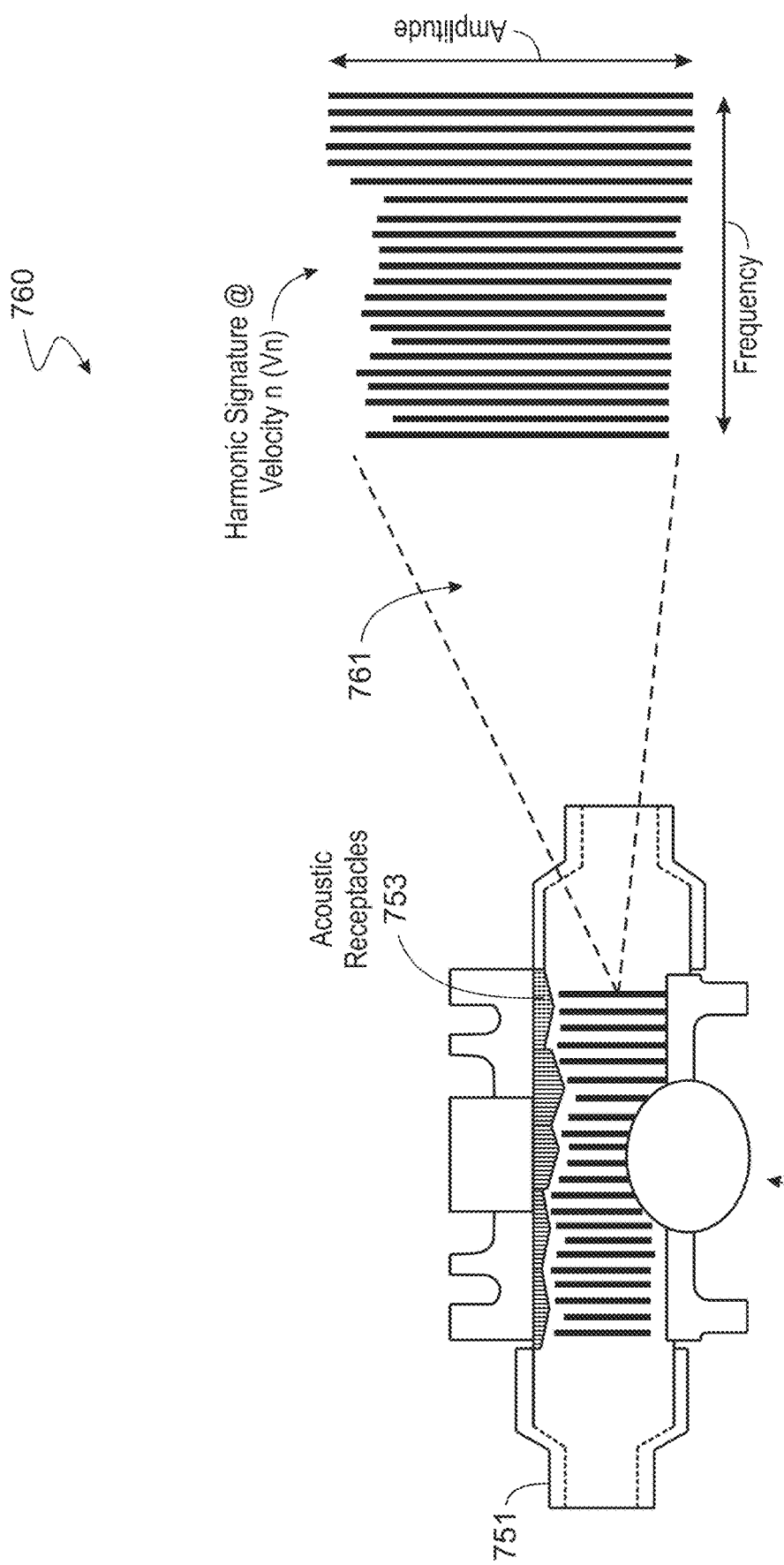

As illustrated in diagram 760 of FIG. 7F, during operation, sound vibration within pipe 751 may be collected as waveforms by acoustic receptacles 753 and clip-on sound collector 752. An example of the waveform can be analyzed to reveal harmonic signature 761, which shows amplitude of the sound vibration as a function of frequency.

Figure 7G:
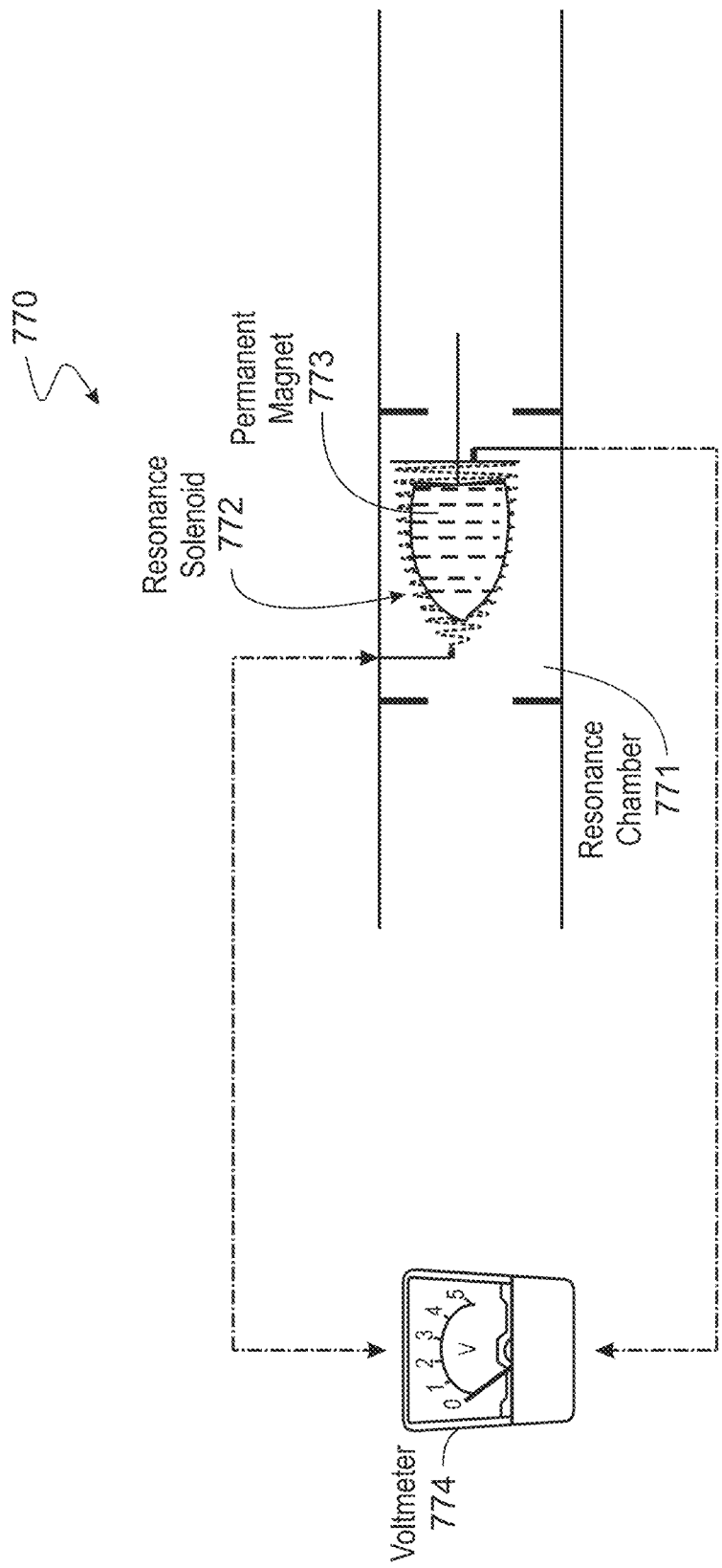
Figure 7H:
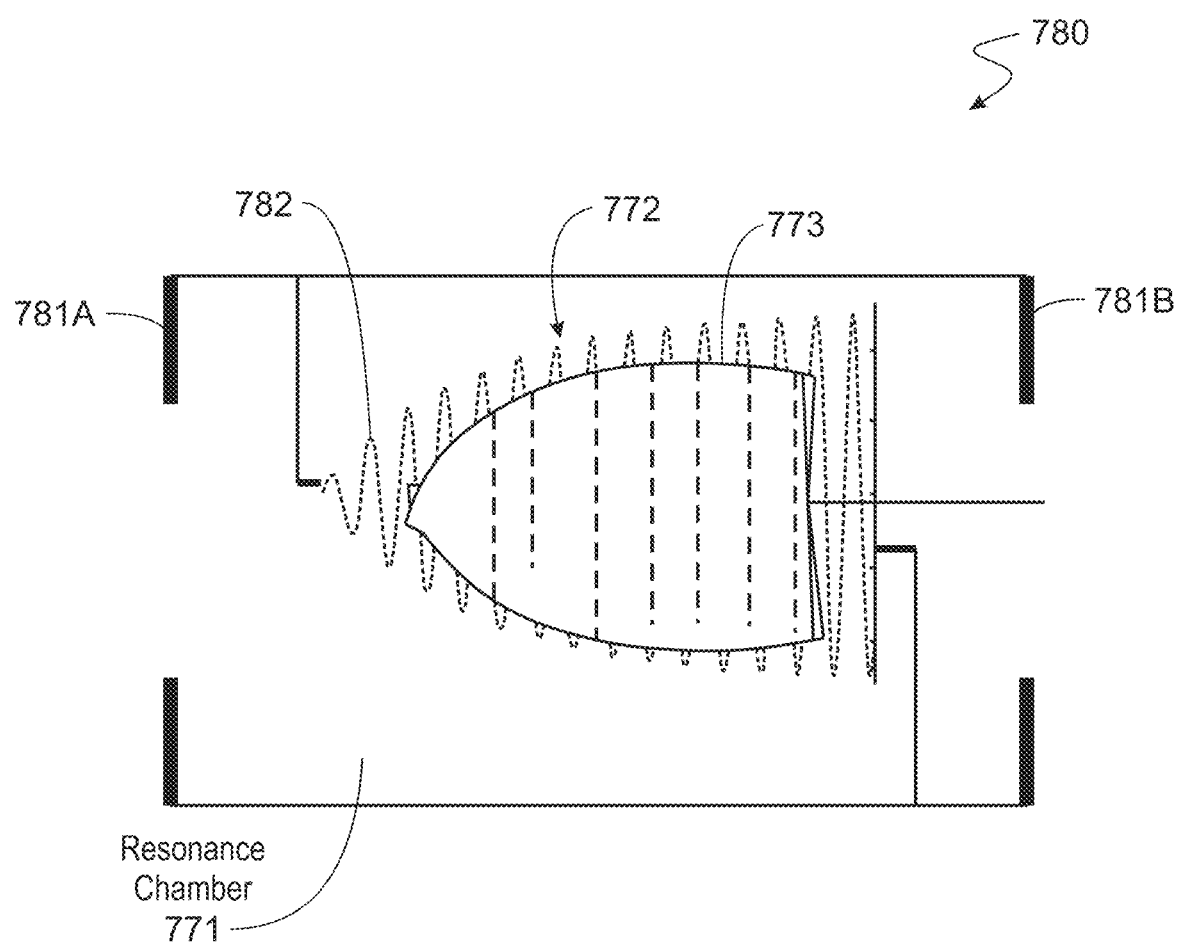

Implementations may incorporate a resonating coil as a sound collector for the correlative sound frequency modelling digital twin. For example, microsound wave may be generated by wind particles colliding against a "Resonance Coil" fitted in the collector's inner walls with a certain frequency and amplitude. Referring to FIG. 7G showing an example of a pipe configuration 770, and diagram FIG. 7H showing a zoomed view 780, air may flow in on the left-hand-side and flows out on the right-hand-side of resonance chamber 771. The generated sound wave over a time unit may represent a "fingerprint," i.e., a unique harmonic model specific to the design of the resonance coil and the velocity of the flowing wind. As illustrated, resonating chamber 771 is created by orifices 781A and 781B. A resonating solenoid coil 772 wrapped around permanent magnet 773 is located inside resonating chamber 751 so that vibrations within a particular frequency range is created. The implementation may provide electrical modeling by using resonating solenoid 772 around a permanent magnet 773 for the digital twin of a plant sound modeling system. As wind travels through the resonance chamber 771 (with orifices 781A for input and 781B for output) as a collector, electrical outputs are generated when wind particles collide against the resonating solenoid 772 fitted in the collector's inner walls around a permanent magnet 773. Through electromagnetic induction, displacement created on resonating solenoid 772 can be converted into an electrical output (e.g., signal 782) so that the microsound signal can be recorded as an electric signal. The produced electrical outputs may be directly proportional to the velocity of the flowing wind, which can then be recorded and memorized for generating a whole plant sound frequency based digital twin. An acoustic sensor (e.g., a piezoelectric crystal, a membrane-driven sound actuator) can also be positioned inside resonance chamber 771). The fingerprint can then be recorded (e.g., by acoustic sensor) and memorized for "normal" baseline operations models.

The design of a correlative sound frequency modeling collector can factor in the potential resonant frequency changes based on environmental factors such as temperature, pressure, etc. The collector may thus be capable of analyzing the resonant frequency based on noise in the pipeline (e.g., compressors, pumps, strainers). For example, the correlative sound frequency modeling collectors can be "smart" by virtue of the ability to receive environmental information parameters from computers (e.g., through the network) and apply auto compensation factor for the change. The correlative sound frequency modeling collectors may be systematically designed to resonate within a pre-defined range of frequency within the range of pipeline noise (e.g., compressors, pumps, strainers). Correlative sound frequency modeling collectors can use multiple sets of receptacles mounted on the inner wall to allow for highly accurate readings of average axial velocity, with diagnostic information about disturbances which could impact model measurement accuracy.

The microsound frequency receptacles may be systematically positioned and oriented with respect to the projected sound source, and angled to provide wide range of frequency pattern attributing sound direction and propagation qualities as compared to perfectly perpendicular positioning the receptacles on the inner walls of the collector. Those receptacles can be configured to be highly sensitive to measure, for example, low noise levels represented by the typical sound field generated by pipes and equipment. The purpose of this type of highly sensitive receptacles is to produce a detailed level or frequency modeling and analysis, which can be leveraged to produce a whole plant model indicator (e.g., a numerical number). The number is then transmitted as an electrical signal from an on-board transducer is fed to an amplifier filtered over a specified range of frequencies.

Some implementations may incorporate a dual chamber digital twin modeling apparatus. For example, the implementations may include a first chamber configured for generally non-stop sound frequency detection while a second chamber is configured in standby mode waiting for a trigger signal to start detection operation when the first chamber undergoes a cleaning process or a diagnostic procedure. The dual chamber design may thus allow for continuous operation in spite of ongoing cleaning or full diagnostics procedure.

Some implementations may provide a self-cleaning digital twin sound collector apparatus. For example, the implementations may include a central cleansing engine fitted on the collector with access to both chambers, albeit one at a time. The cleansing engine involves a compressed air injector targeting the collector's inner components. The cleansing engine can be activated during maintenance intervals when a chamber is being cleansed. The air flow in the collector may resume using the second chamber with no impact on operation.

Some implementations provide a method based on augmented reality, image processing and advanced data analytics, heat map and correlation to identify and locate non-compliance occurrences pertaining to site and worker's safety as mandated by loss prevention, health, and safety standards and regulations. The implementations can have the ability to read and depict extensive number of safety standard's parameters, such as waiver requests and associated cost figures, potential safety or physical security implications, user's revision feedbacks and industry references and makes an intelligent correlation for the purpose of timely and continuously enhancing site and workforce safety optimization process.

For example, in some implementations, the site safety optimization process involves a system with three main components, namely, an input engine, an analysis engine, and an advisory engine. By way of illustration, empirical data for the different variables contributing to the overall model are fed into the input engine. In some cases, the input engine may be coupled to, for example, resonating solenoid 772, so that electric signals corresponding to microsound signals are received. The input engine may include a multidimensional database holding, for example, voluminous records based on information such as:

- Complete compilation of industry standard controls (control by control) in which the standard defines different controls that address the attributes of the design. The input engine can extract all of the different controls outlined in the standard in a tabulated format with check list validation.
- Complete compilation of internal standard controls (control by control)
- Comprehensive one-one mappings (between industry referenced standards and internal standards)
- Number of waiver, exceptions, and additions requests per standard
- Number of waiver exceptions, and additions requests per control in each standard
- Potential cost savings OR implication associated with a waiver
- Potential safety implications associated with a waiver request
- Time since last optimization
- Standards Revision requests
- Users' feedback on previous revisions process
- Result of industry standard overlay check (e.g., is control one of: "omitted", "relaxed", "stringent"?)
- Acceptable delta tolerance of less-than-optimal design requirements (i.e. 85%, 90%, 95%?)

Generally speaking, the level of details fed to the input engine may significantly impact the accuracy and beneficial aspect of the automated optimization model. In some cases, the more data, the improved granularity detailing of the input can be taken into consideration. For example, the input engine can dissect each standard (e.g., based on International Standard organizations such as IEC, ISO, etc., or professional organizations such as PMI, ISA, or Company, or internally developed standards) into individual controls so that the individual controls are sequentially mapped into the respective counterparts in referenced industry standards, thus creating an electronic "overlay" that can be later used by the "analysis engine." The same processing can be performed on other information records, thus maintaining the same level of details. While such processing can be time consuming at the start of constructing a digital twin, once the process is in place, the process pays dividends with improved results from the analysis engine and the advisory engine.

Based on input that has been processed at the input engine, the "analysis engine" may operate an optimization process by accessing the entire standards database created by the "input engine" for which more fine-grained examinations, correlations and cross checks can be performed for each control. For example, the "analysis engine" may identify "instances" in need of immediate "optimization" affecting the following "controls", with foreseen "Cost Savings=$$", and "safety" implications. An objective of the "analysis engine" may include optimizing a particular plant or construction site relative to the standard without a lengthy reliance on arbitrary time cycles or manual process, nor on Subject Matter Expert's (SME's) own initiative behavior as it is objectively decided by computers through the use of data analytics, artificial intelligence, and machine learning. In some cases, dynamic analysis of construction safety and machine operating standards requirements can provide intelligent prediction as to the overall site safety posture. A call (e.g., software call) initiated by the "analysis engine" to initiate site safety optimization process can be substantiated with a detailed report highlighting global cost savings figures including figures not only for one particular site, but rather spanning the entire tree of company's site or construction project library, thus providing the holistic up-front return on investment figures.

In some implementations, the correlation of information between the controls in various standards and construction site instances can be implemented by devising multidimensional intelligence logic based on keyword and advanced image recognition, indexing under a functional criterion and other element capable of fostering an intelligent logic. For example, a minimum compressive strength requirement of 4000 PSI concrete in a building code standard and Internet Protocol camera (or CCTV camera) minimum outdoor temperature support of 55 degrees, can be indexed under "robustness."

In some implementations, the safety optimization process may further incorporate a complementary process performing a proactive reporting and alerting logic capable of continuously monitoring the safety optimization index and generating an alert when certain thresholds are reached. In some cases, the alert can be triggered by a dynamic or fixed threshold which the end user can define proactively. The alerts can be communicated via email or displayed over electronic dashboard.

Based on results from the "analysis engine," an "advisory engine" may suggest the actual plan detailing, for example, recommended change or modification to the a design or a component in the construction site. While the "analysis engine" provides the data for the need to revise or optimize a safety issue, the "advisory engine" goes further by improvising the action plan to resolve the safety issue. For example, in a manual safety optimization process, the responsible Subject Matter Expert may attempt to re-visit the cost-benefit analysis for a single instance in a single site. In comparison, the "advisory engine" can automate the value assessment process globally for all sites, so that the analysis can be carried out more globally by considering the cost in terms of manpower, time and logistics globally.

Figure 8:
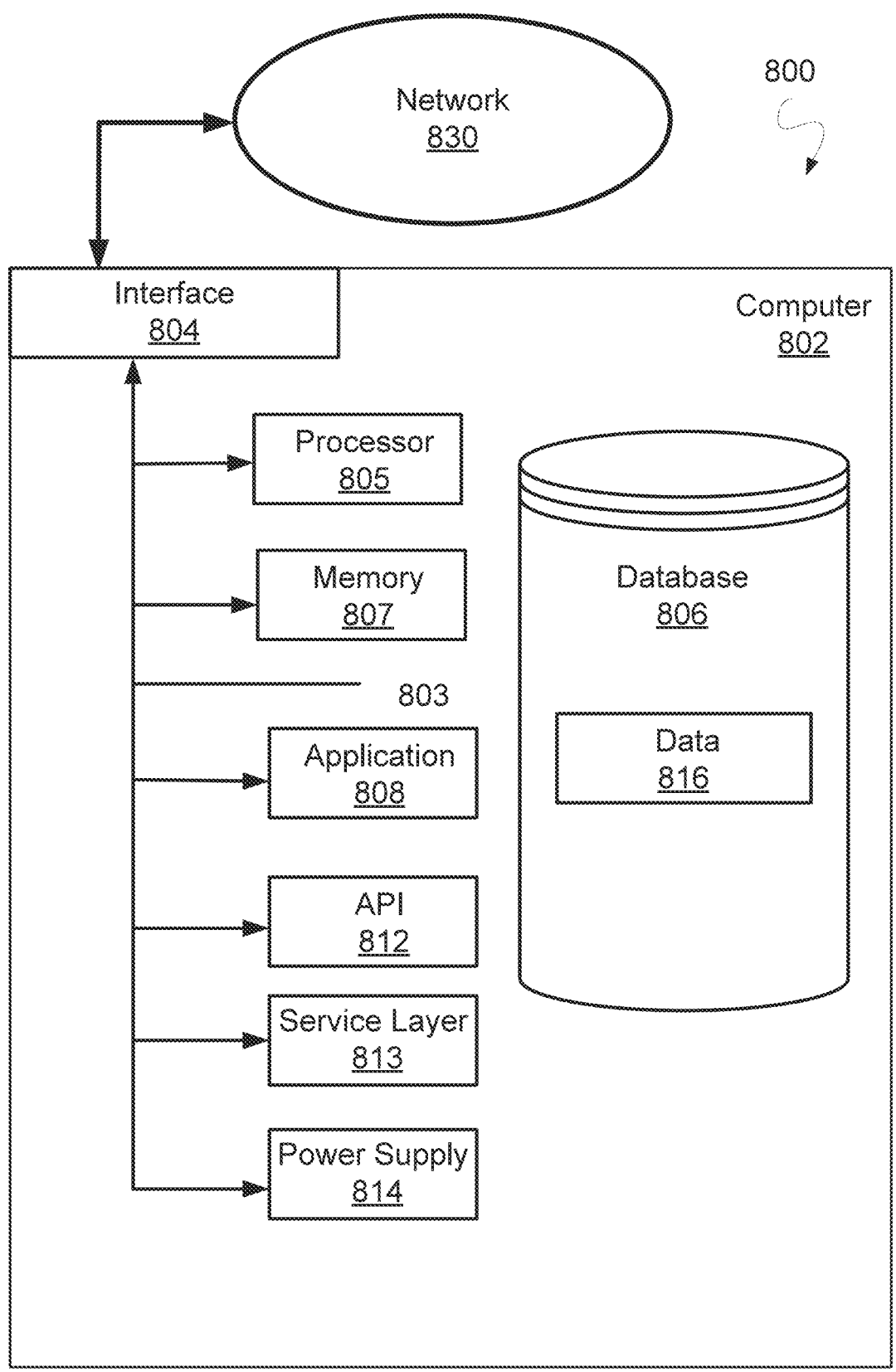
FIG. 8 is a block diagram illustrating an example of a computer system used to provide computational functionalities associated with described algorithms, methods, functions, processes, flows, and procedures, according to an implementation of the present disclosure.

FIG. 8 is a block diagram 800 illustrating an example of a computer system 600 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 830. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 830 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

Each of the components of the computer 802 can communicate using a system bus 803. In some implementations, any or all of the components of the computer 802, including hardware, software, or a combination of hardware and software, can interface over the system bus 803 using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 830 in a distributed environment. Generally, the interface 804 is operable to communicate with the network 830 and comprises logic encoded in software, hardware, or a combination of software and hardware. More specifically, the interface 804 can comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data for the computer 802, another component communicatively linked to the network 830 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases of similar or differing types can be used according to particular needs, desires, or particular implementations of the computer 802 and the described functionality. While database 806 is illustrated as an integral component of the computer 802, in alternative implementations, database 806 can be external to the computer 802. As illustrated, the database 806 holds the previously described data 816 including, for example, multiple streams of data from various sources, such as the aerial scanning, mobile scanning, and fixed floor scanning, as explained in more detail in association with FIGS. 1A to 1C and 5.

The computer 802 also includes a memory 807 that can hold data for the computer 802, another component or components communicatively linked to the network 830 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 830. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method to manage an infrastructure construction digital integrated twin (ICDIT) for an industrial plant facility where two or more execution agencies operate concurrently, the method comprising:
   connecting the ICDIT to an interface management system through one or more application program interfaces (APIs) of one or more databases storing information captured a network of sensors showing real-time activities of the two or more execution agencies operating concurrently for the industrial plant facility, wherein the interface management system comprises rules governing interface points that bridge communication between the two or more execution agencies;
   scanning, using the APIs and according to the rules, the interface points of the two or more execution agencies, wherein the interface points are accessible through the interface management system; and
   at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agencies.

2. The computer-implemented method of claim 1, wherein each interface point comprises at least one unique attribute for mapping to the class library of the ICDIT, and
   wherein the at least one unique attribute comprises a tag number.

3. The computer-implemented method of claim 1, further comprising:
   creating one or more new attributes based on an interface point accessible through the interface management system.

4. The computer-implemented method of claim 3, wherein said migrating comprises:
   adding the one or more new attributes to the class library.

5. The computer-implemented method of claim 1, further comprising:
   subsequent to said migrating, comparing attributes of the interface points migrated from different execution agencies into the class library.

6. The computer-implemented method of claim 5, further comprising:
   in response to determining that an attribute of a migrated interface point from a first execution agency does not match the attribute of the migrated interface point from a second execution agency, flagging the migrated interface point as a risk; and
   calculating a risk score based on a number of interdependencies by other interface points on the migrated interface point.

7. The computer-implemented method of claim 6, wherein the attribute comprises at least one of: a material specification, a size, a classification, a material classification, and a schedule, and wherein the real-time activities encompass construction activities as well as operation activities of the industrial plant facility.

8. A computer system comprising:
   a network of sensors comprising microsound sensors;
   a processor; and
   at least one memory,
   wherein the at least one memory comprise software instructions that, when executed by the processor, cause the processor perform operations to manage an infrastructure construction digital integrated twin (ICDIT) for an industrial plant facility where two or more execution agencies operate concurrently, the operations comprising:
   connecting the ICDIT to an interface management system through one or more application program interfaces (APIs) of one or more databases storing information captured by the network of sensors showing real-time activities of the two or more execution agencies operating concurrently for the industrial plant facility, wherein the interface management system comprises rules governing interface points that bridge communication between the two or more execution agencies;
   scanning, using the APIs and according to the rules, the interface points of the two or more execution agencies, wherein the interface points are accessible through the interface management system; and
   at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agencies.

9. The computer system of claim 8, wherein each interface point comprises at least one unique attribute for mapping to the class library of the ICDIT, and
   wherein the at least one unique attribute comprises a tag number.

10. The computer system of claim 8, the operations further comprising:
    creating one or more new attributes based on an interface point accessible through the interface management system.

11. The computer system of claim 10, wherein said migrating comprises:
    adding the one or more new attributes to the class library.

12. The computer system of claim 8, the operations further comprising:
    subsequent to said migrating, comparing attributes of the interface points migrated from different execution agencies into the class library.

13. The computer system of claim 8, the operations further comprising:
    in response to determining that an attribute of a migrated interface point from a first execution agency does not match an attribute of the migrated interface point from a second execution agency, flagging the migrated interface point as a risk; and calculating a risk score based on a number of interdependencies by other interface points on the migrated interface point.

14. The computer system of claim 13, wherein the attribute comprises at least one of: a material specification, a size, a classification, a material classification, and a schedule, and wherein the real-time activities encompass construction activities as well as operation activities of the industrial plant facility.

15. A non-volatile computer readable medium comprising software instructions, which, when executed by a computer processor, cause the computer processor to perform operations to manage an infrastructure construction digital integrated twin (ICDIT) for an industrial plant facility where two or more execution agencies operate concurrently, the operations comprising:

connecting the ICDIT to an interface management system through one or more application program interfaces (APIs) of one or more databases storing information captured a network of sensors showing real-time activities of the two or more execution agencies operating concurrently for the industrial plant facility, wherein the interface management system comprises rules governing interface points that bridge communication between the two or more execution agencies;

scanning, using the APIs and according to the rules, the interface points of the two or more execution agencies, wherein the interface points are accessible through the interface management system; and at least based on results of the scanning, migrating the interface points from the interface management system to a class library of the ICDIT such that when the ICDIT creates a rendering of the industrial plant facility, the interface points are mapped on the rendering according to up-to-date information based on the real-time activities of the two or more execution agencies.

16. The non-volatile computer readable medium of claim 15, wherein each interface point comprises at least one unique attribute for mapping to the class library of the ICDIT, and wherein the at least one unique attribute comprises a tag number.

17. The non-volatile computer readable medium of claim 15, the operations further comprising:

creating one or more new attributes based on an interface point accessible through the interface management system, wherein said migrating comprises:

adding the one or more new attributes to the class library.

18. The non-volatile computer readable medium of claim 15, the operations further comprising:

subsequent to said migrating, comparing attributes of the interface points migrated from different execution agencies into the class library.

19. The non-volatile computer readable medium of claim 15, the operations further comprising:

in response to determining that an attribute of a migrated interface point from a first execution agency does not match an attribute of the migrated interface point from a second execution agency, flagging the migrated interface point as a risk; and calculating a risk score based on a number of interdependencies by other interface points on the migrated interface point.

20. The non-volatile computer readable medium of claim 19, wherein the attribute comprises at least one of: a material specification, a size, a classification, a material classification, and a schedule, and wherein the real-time activities encompass construction activities as well as operation activities of the industrial plant facility.

* * * * *